(12) United States Patent
Ikuta et al.

(10) Patent No.: US 12,467,903 B2
(45) Date of Patent: Nov. 11, 2025

(54) DETECTOR DEVICE

(71) Applicant: Sharp Display Technology Corporation, Kameyama (JP)

(72) Inventors: Kei Ikuta, Kameyama (JP); Takeshi Hara, Kameyama (JP); Tomoko Teranishi, Kameyama (JP); Tomohiro Kosaka, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 280 days.

(21) Appl. No.: 18/276,619

(22) PCT Filed: Apr. 19, 2021

(86) PCT No.: PCT/JP2021/015850
§ 371 (c)(1),
(2) Date: Aug. 9, 2023

(87) PCT Pub. No.: WO2022/224299
PCT Pub. Date: Oct. 27, 2022

(65) Prior Publication Data
US 2024/0310329 A1    Sep. 19, 2024

(51) Int. Cl.
*G01N 27/624* (2021.01)

(52) U.S. Cl.
CPC .............................. *G01N 27/624* (2013.01)

(58) Field of Classification Search
CPC .......................... G01N 27/624; G01N 27/62
See application file for complete search history.

(56) References Cited

U.S. PATENT DOCUMENTS

| | | | | |
|---|---|---|---|---|
| 5,965,882 A | * | 10/1999 | Megerle | G01N 27/622 250/287 |
| 6,495,823 B1 | * | 12/2002 | Miller | H01J 49/0018 250/288 |
| 6,512,224 B1 | * | 1/2003 | Miller | G01N 27/624 250/286 |
| 6,815,669 B1 | * | 11/2004 | Miller | H01J 49/0018 250/286 |

(Continued)

FOREIGN PATENT DOCUMENTS

| | | | |
|---|---|---|---|
| JP | 2019-121509 A | 7/2019 | |
| WO | WO-0108197 A1 * | 2/2001 | .......... H01J 49/0018 |

(Continued)

*Primary Examiner* — David A Vanore
(74) *Attorney, Agent, or Firm* — ScienBiziP, P.C.

(57) ABSTRACT

A detector device includes a pair of filter electrodes, a collector electrode collecting charged particles that pass through a space between the pair of filter electrodes, and a detection circuit connected to the collector electrode and detecting an amount of the charged particles that are collected. The collector electrode includes an upper electrode layer having a collection surface that receives the charged particles, a lower electrode layer that is disposed opposite a surface of the upper electrode layer that is an opposite surface from the collection surface, and an insulation layer having an insulation property and disposed between the upper electrode layer and the lower electrode layer. The detection circuit is configured to be connected to one of the upper electrode layer and the lower electrode layer.

13 Claims, 16 Drawing Sheets

(56) References Cited

U.S. PATENT DOCUMENTS

| | | | | |
|---|---|---|---|---|
| 7,645,996 B2* | 1/2010 | Yang | | H01J 49/025 250/374 |
| 8,410,432 B2* | 4/2013 | Miller | | G01N 27/624 250/281 |
| 10,942,149 B2 | 3/2021 | Ujimoto et al. | | |
| 2001/0030285 A1* | 10/2001 | Miller | | G01N 27/64 250/288 |
| 2003/0146377 A1* | 8/2003 | Miller | | H01J 49/0018 250/288 |
| 2004/0094704 A1* | 5/2004 | Miller | | G01N 27/624 250/282 |
| 2005/0029449 A1* | 2/2005 | Miller | | G01N 27/624 250/293 |
| 2005/0133716 A1* | 6/2005 | Miller | | H01J 49/0018 250/293 |
| 2005/0167583 A1* | 8/2005 | Miller | | G01N 27/624 250/281 |
| 2005/0173629 A1* | 8/2005 | Miller | | G01N 27/624 250/290 |
| 2007/0029477 A1* | 2/2007 | Miller | | G01N 30/7206 250/290 |
| 2007/0176092 A1* | 8/2007 | Miller | | G01N 27/624 250/288 |
| 2008/0185512 A1* | 8/2008 | Miller | | H01J 49/004 250/287 |
| 2009/0121128 A1* | 5/2009 | Griffin | | G01N 27/624 250/281 |
| 2009/0189064 A1* | 7/2009 | Miller | | G01N 30/7206 250/281 |
| 2012/0025070 A1* | 2/2012 | Miller | | H01J 49/004 250/287 |
| 2019/0204273 A1* | 7/2019 | Ujimoto | | H01J 49/10 |
| 2023/0204541 A1* | 6/2023 | Kosaka | | G01N 27/624 250/281 |
| 2024/0036002 A1* | 2/2024 | Daio | | G01N 27/624 |
| 2024/0310329 A1* | 9/2024 | Ikuta | | G01N 27/62 |

FOREIGN PATENT DOCUMENTS

| | | | | |
|---|---|---|---|---|
| WO | WO-2008094704 A2 * | 8/2008 | | H01J 49/004 |
| WO | WO-2009092007 A1 * | 7/2009 | | G01N 27/622 |
| WO | WO-2022219825 A1 * | 10/2022 | | G01N 27/624 |
| WO | WO-2022224299 A1 * | 10/2022 | | G01N 27/62 |

* cited by examiner

DETECTOR DEVICE

TECHNICAL FIELD

The technology described herein is related to a detector device that detects charged particles.

BACKGROUND ART

The analysis method of ionizing an analysis target containing components and separating the components and detecting each component with the ions moving has been widely used. One of the various separation methods of separating the ionized substance is gas phase mobility measurement using the difference in the degree of mobility. Patent Document 1 discloses a field asymmetric ion mobility spectrometry (FAIMS) system. In the FAIMS system, a voltage is applied such that the polarity is switched between positive and negative in an asymmetric manner with respect to a direction vertical to a mobility direction of the molecules moving in the gas phase. In the FAIMS system, as illustrated in FIG. 24, the mobility direction of the ionized molecules is changed by an electric field and only the ionized molecules having specific mobility can pass through the electric field. Thus, the ionized molecules can be filtered. With the collector electrode collecting the ionized molecules that have passed through the electric field, the amount (the concentration) of the ionized molecules can be detected.

PRIOR ART DOCUMENT

Patent Document
  Patent Document 1: Japanese Unexamined Patent Application Publication No. 2019-121509

Problem to be Solved by the Invention

With such an analysis method, the analysis in a dynamic range is preferably demanded. Particularly, with the analysis method being used for an olfactory sensor or an expiration sensor, it is desirable to detect simply and accurately a trace component of a very low concentration with the order of ppb or ppt. However, with using the method of applying an electric field in the filtering, the signal supplied for applying the electric field is detected as a noise as illustrated in FIG. 23. Therefore, the detection accuracy of detecting the trace component decreases compared to the mass spectrometry in which no voltage is applied for the filtering.

DISCLOSURE OF THE PRESENT INVENTION

The technology described herein was made in view of the above circumstances. An object is to increase detection accuracy of detecting a trace component.

Means for Solving the Problem (1) A detector device according to the present technology includes a pair of filter electrodes that are disposed opposite each other, a collector electrode collecting charged particles that pass through a space between the pair of filter electrodes, and a detection circuit connected to the collector electrode and detecting an amount of the charged particles that are collected. The collector electrode includes an upper electrode layer having a collection surface that receives the charged particles, a lower electrode layer that is disposed opposite a surface of the upper electrode layer that is an opposite surface from the collection surface, and an insulation layer having an insulation property and disposed between the upper electrode layer and the lower electrode layer. The detection circuit is configured to be connected to one of the upper electrode layer and the lower electrode layer.

(2) One aspect of the present technology may include, in addition to the above configuration (1), a first substrate and a second substrate that have an insulating property and are plate members and disposed to be opposite each other. The collector electrode and one of the filter electrodes may be disposed on an opposing surface of the first substrate to be away from each other and the lower electrode layer of the collector electrode may be contacted with the first substrate. Another one of the filter electrodes and a deflection electrode may be disposed on an opposing surface of the second substrate to be away from each other. The deflection electrode may be for deflecting the charged particles toward the upper electrode layer of the collector electrode.

(3) One aspect of the present technology may include, in addition to the above configuration (1), a first substrate and a second substrate that have an insulating property and are plate members and disposed to be opposite each other. The collector electrode and one of the filter electrodes may be disposed on an opposing surface of the first substrate to be away from each other and the upper electrode layer of the collector electrode may be contacted with the first substrate. Another one of the filter electrodes, a deflection electrode, and the lower electrode layer of the collector electrode may be disposed on an opposing surface of the second substrate to be away from each other. The deflection electrode may be for deflecting the charged particles toward the upper electrode layer of the collector electrode.

(4) According to one aspect of the present technology, in addition to the above configuration (3), the insulation layer of the collector electrode may be configured as a spacer that defines a distance between the first substrate and the second substrate.

(5) According to one aspect of the present technology, in addition to one of the above configurations (2) to (4), a distance between the first substrate and the second substrate may be 1 mm or less.

(6) One aspect of the present technology may include, in addition to any one of the above configurations (2) to (5), a second lower electrode layer and a second insulation layer that are disposed between the deflection electrode and the second substrate in this order from a second substrate side.

(7) One aspect of the present technology may include, in addition to any one of the above configurations (2) to (6), an ionization source disposed on at least one of the first substrate and the second substrate and on an opposite side from the collector electrode with respect to the pair of filter electrodes. The ionization source may ionize gas molecules.

(8) One aspect of the present technology may include, in addition to any one of the above configurations (1), (2), and (5) to (7), a shield electrode layer disposed on a surface of the insulation layer to be away from and surround the upper electrode layer.

(9) According to one aspect of the present technology, in addition to any one of the above configurations (1) to (8), thicknesses of the pair of filter electrodes, the upper electrode layer, and the lower electrode layer may be 1 µm or less.

(10) According to one aspect of the present technology, in addition to any one of the above configurations (1) to (9), the pair of filter electrodes and the upper electrode layer may have surfaces that are to be contacted with the charged particles and at least the surfaces may be made of organic electrically conductive material or inorganic electrically conductive material.

(11) According to one aspect of the present technology, in addition to any one of the above configurations (1) to (10), the detection circuit may include a switching circuit that switches a connection state with respect to one of the upper electrode layer and the lower electrode layer between connection and disconnection.

(12) According to one aspect of the present technology, in addition to the above configuration (11), the switching circuit may be configured to change switching timing according to concentration of the charged particles.

(13) One aspect of the present technology may include, in addition to one of the above configurations (11) or (12), a potential adjustment section configured to apply a voltage between the pair of filter electrodes and change a potential difference between the pair of filter electrodes stepwise. The detection circuit may be configured to be connected to one of the upper electrode layer and the lower electrode layer at a timing when the potential adjustment section changes the potential difference.

Advantageous Effect of the Invention

According to the technology described herein, detection accuracy of detecting a trace component can be increased.

MODES FOR CARRYING OUT THE INVENTION

One preferable embodiment according to the technology described herein will be described below. Technological matters (general matters related to the configuration of an ionization source and the technology of driving the ionization source and the technology of driving an ion filter, and general matters related to processing and analysis of information detected by the detector device, for instance) that are necessary for carrying out the present technology other than the technological matters (the configuration of a detector device described herein, for instance) that are described herein can be considered as design matters by those having skills in the art based on the conventional art in the field of analysis engineering. The present technology can be carried out based on the description herein and the known technology in this field.

First Embodiment

Figure 1:
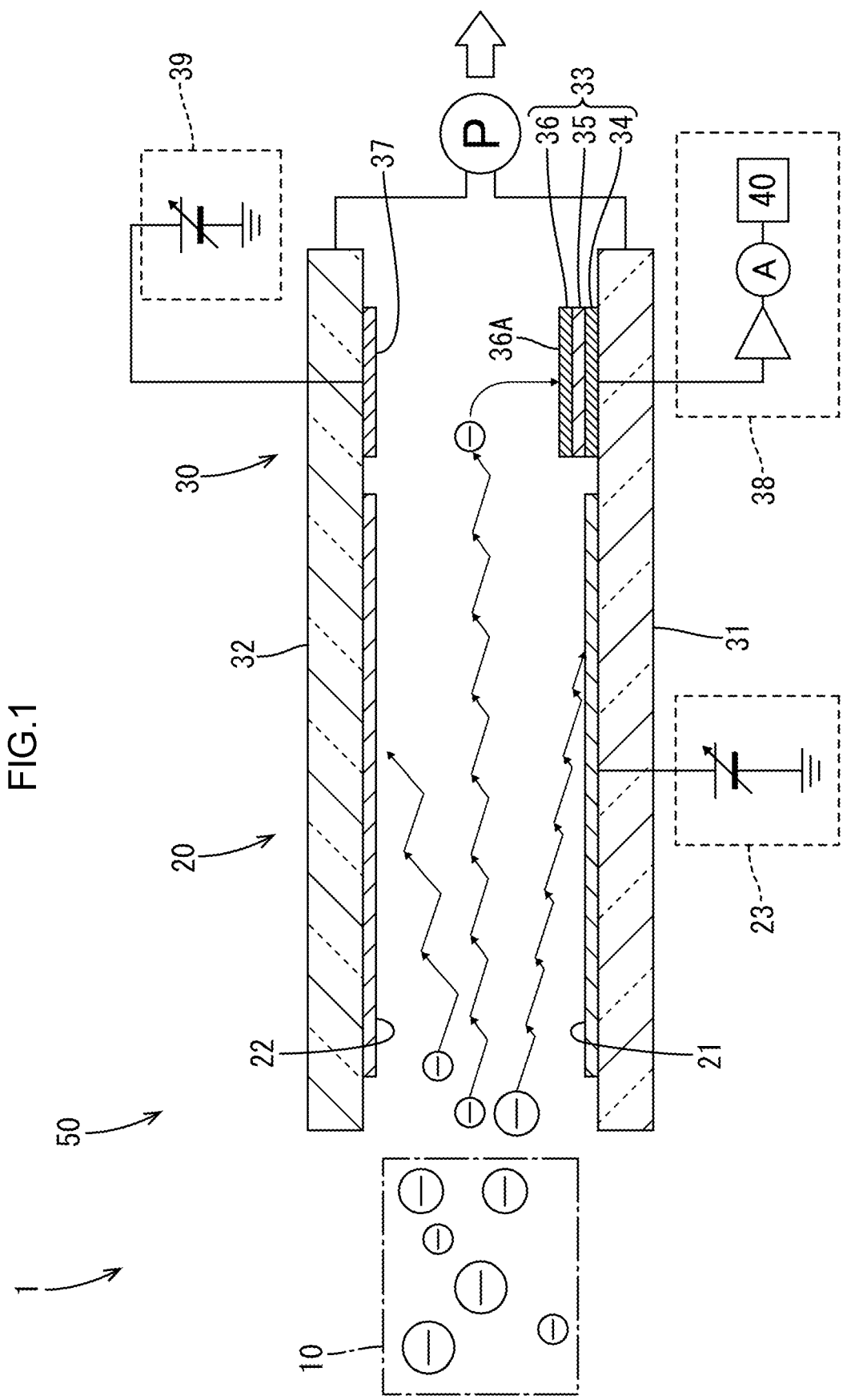
FIG. 1 a general view illustrating a configuration of a mobility analyzer including a detector device according to one embodiment FIG. 2 a heat map illustrating a relation of an amount of example ions that is measured the mobility analyzer and analysis conditions FIG. 3 a graph typically representing the heat map of FIG. 2

Features of a detector device described herein will be described with reference to FIGS. 1 to 12. FIG. 1 illustrates a general configuration of a mobility analyzer 1 (simply referred to as an analyzer) using the FAIMS. The analyzer 1 includes an ionization source 10, an ion filter section 20, a detection section 30, and a control section 40. A detector device 50 described herein at least includes the ion filter section 20 and the detection section 30 of the analyzer 1. Each component will be described below.

The ionization source 10 is a device of ionizing atoms and molecules of a compound which is a sample to be analyzed. The ionization method of the ionization source 10 is not particularly limited but various kinds of known ionization sources can be used. Examples of the ionization method include electron impact (EI) ionization, chemical ionization, gas-discharge ionization, photoionization, deposition ionization, electrospray ionization (ESI), thermal ionization, and ambient ionization. A combination of the example methods may be used as the ionization method. The ionization source may be appropriately selected such that components that need to be detected can be ionized. This embodiment includes a needle electrode as the ionization source 10 although the needle electrode is not particularly illustrated. Corona discharge occurs by the needle electrode under an atmospheric pressure to create reactive ions. The reactive ions react with sample atoms and sample molecules and sample ions are indirectly created. The sample ions are one example of charged particles in the present technology. Ion cluster may be used as an example of the charged particles.

Other than the needle electrode, the ionization source 10 may be an ionization unit that includes a radioactive ionization source including nickel isotope ($^{63}$Ni) or americium isotope ($^{241}$Am) and ionizes the sample created by the radioactive ionization source or may be an ionization unit that includes an ultraviolet pulse laser oscillator and irradiates the sample with ultraviolet pulse laser beam such that the sample is directly subjected to ablation and ionized. The sample ions created by the ionization source 10 are transferred toward the ion filter section 20 by gas flow of atmospheric gas (neutral buffer gas) such as atmosphere that is fed by a pump P.

Various kinds of a gas feeding device that can transfer the sample ions created by the ionization source 10 to the ion filter section 20 and the detection section 30, which will be described later, at predefined speed can be used as the pump P. A gas feeding mechanism of the pump P is not particularly limited and may be a diaphragm pump, a rotary-blade type pump, a piston type pump, or rotary vane pump. One example of the pump P may be a micro blower that has a greatest discharge pressure of about 0.03 MPa or smaller and a flow rate of about 1 L/min, although the specific values depend on the size of the ion filter section 20 and the detection section 30. The micro blower that fluctuates a diaphragm with a high frequency vibration (such as ultrasonic vibration) by a piezoelectric ceramic can supply gas with suppressing pulsation and is preferably used as the pump P in this embodiment.

The ion filter section 20 is for dividing (filtering) the ions created by the ionization source 10 according to a difference in the degree of mobility. The ion filter section 20 includes a first filter electrode 21, a second filter electrode 22, and a first potential adjustment section 23.

The first filter electrode 21 and the second filter electrode 22 are configured as a pair of filter electrodes and are plate electrodes that have a substantially same size and are disposed parallel to each other with a space therebetween. The example ions flow between the first filter electrode 21 and the second filter electrode 22. A space between the first filter electrode 21 and the second filter electrode 22 is an ion separation space. The first filter electrode 21 and the second filter electrode 22 are disposed on opposing surfaces of a first substrate 31 and a second substrate 32, which will be described later. The thicknesses of the first filter electrode 21 and the second filter electrode 22 are about 1 µm or less, typically 600 nm or less, and 400 nm or less, for example. The thicknesses of the first filter electrode 21 and the second filter electrode 22 are about 50 nm or more, typically 100 nm or more, and 200 nm or more, for example. The dimensions of the first filter electrode 21 and the second filter electrode 22 measured in a direction in which the sample ions move are about 0.1 cm or more (1 cm or more, for example) and about 50 cm or less (10 cm or less, for example). The dimensions are not limited to the above values. In the following, with the first filter electrode 21 and the second filter electrode 22 being not necessary to be distinguished from each other, they are generally referred to as filter electrodes 21, 22.

Figure 2:
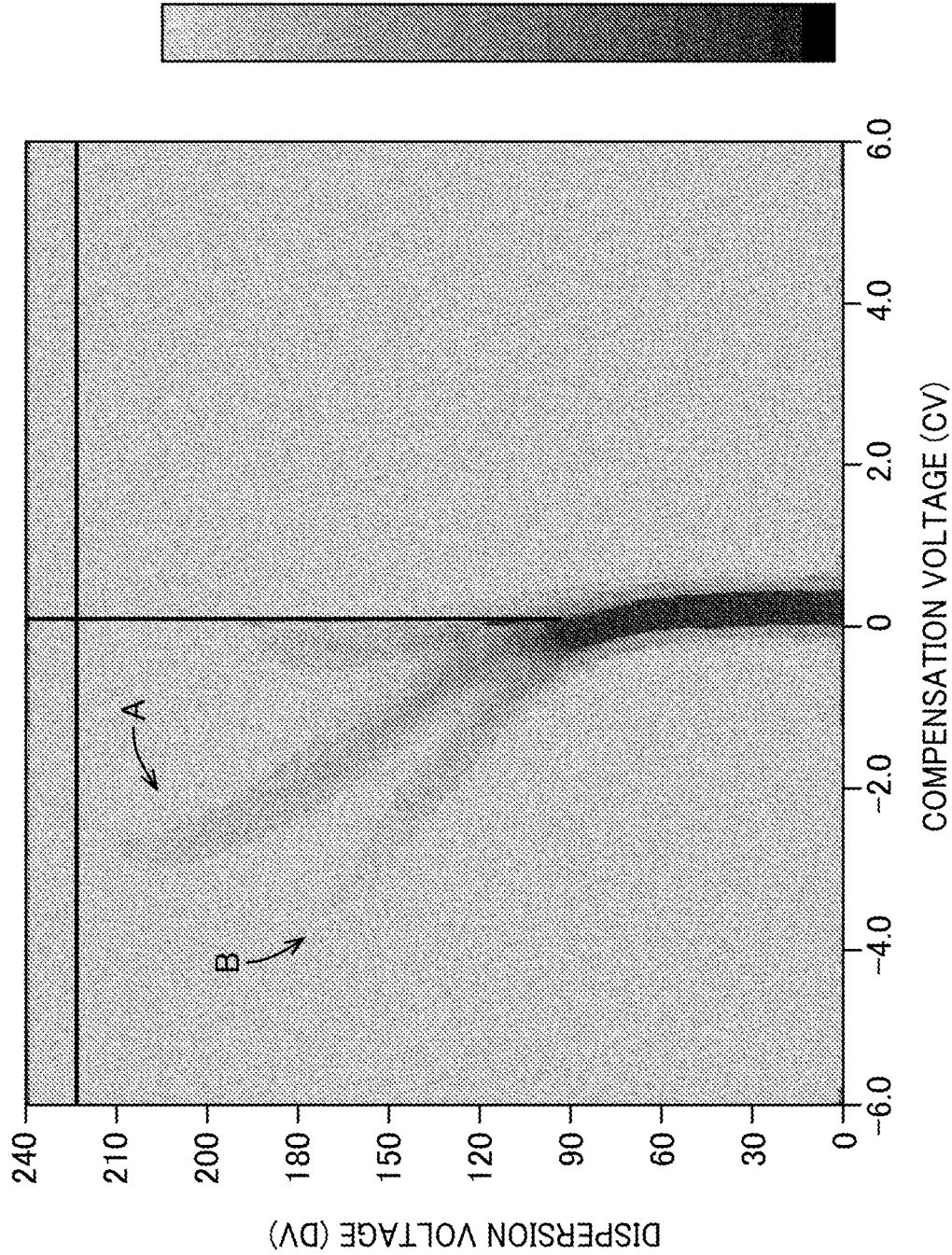
Figure 3:
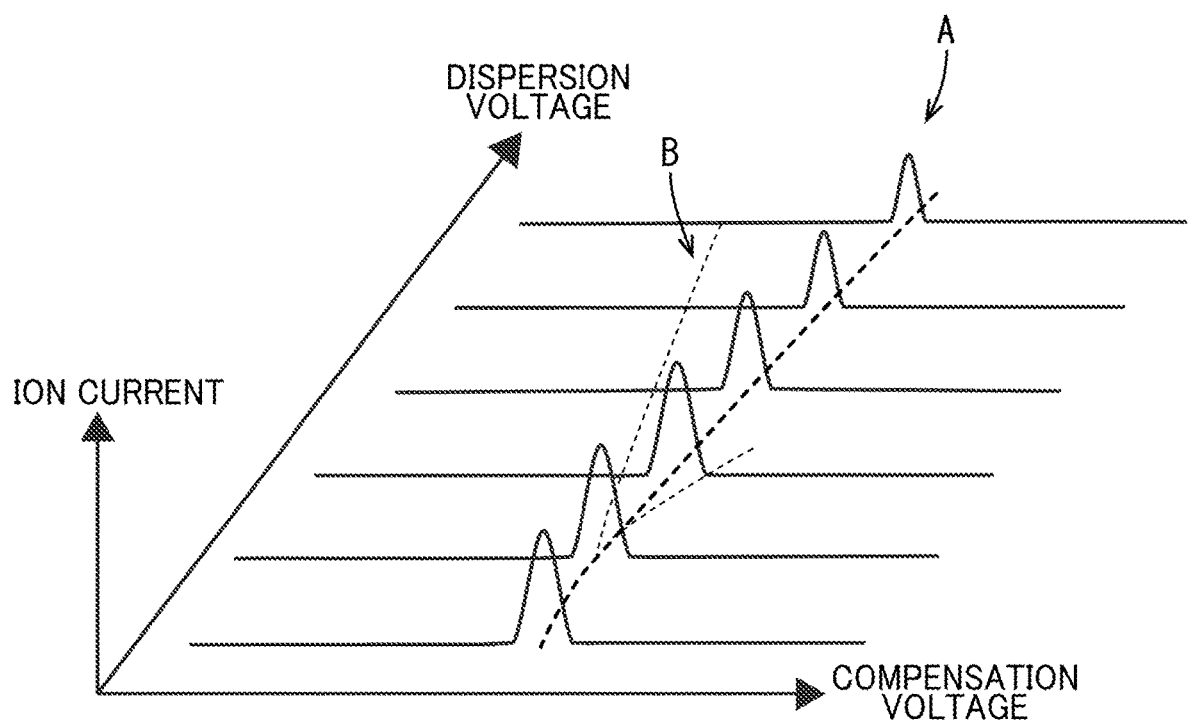
Figure 4:
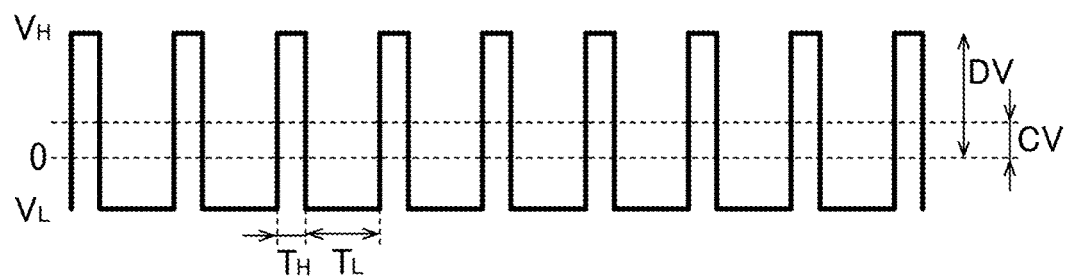
FIG. 4 a graph illustrating a waveform of dispersion voltage components applied between a pair of filter electrodes FIG. 5 a graph illustrating a waveform of compensation voltage components applied between the pair of filter electrodes and connection timing of a switching circuit FIG. 6 a circuit diagram illustrating a configuration of a detection circuit according to one embodiment FIG. 7 a control timing chart of sections of the mobility analyzer according to one embodiment FIG. 8A a cross-sectional view of a portion of the detector device in one producing process according to one embodiment FIG. 8B a cross-sectional view of a portion of the detector device in one producing process according to one embodiment FIG. 8C a cross-sectional view of a portion of the detector device in one producing process according to one embodiment FIG. 8D a cross-sectional view of a portion of the detector device in one producing process according to one embodiment FIG. 8E a cross-sectional view of a portion of the detector device in one producing process according to one embodiment FIG. 9 a plan view illustrating one producing process of the detector device according to one embodiment FIG. 10 a plan view illustrating one producing process of the detector device according to one embodiment FIG. 11 a plan view illustrating one producing process of the detector device according to one embodiment FIG. 12 a cross-sectional view along A-A line in FIG. 11

The distance (gap) between the first filter electrode 21 and the second filter electrode 22 is not strictly determined. With a filter gap being decreased, the intensity of the field (corresponding to dispersion voltage which will be described later) that is created in the ion separation space can be effectively increased. For example, FIGS. 2 and 3 are a map graph illustrating a relation of the analysis conditions (compensation voltage and dispersion voltage which will be described later) and the amount of sample ions detected under the analysis conditions in the analyzing of an analysis target by the mobility analyzer 1 and a schematic view thereof. In the graph of FIG. 2, the analysis conditions under which the greater amount of example ions are detected are illustrated with darker color. As illustrated in FIG. 2, the analysis target includes two components A, B, which are designated by arrows, in addition to the carrier gas component. It can be understood that the detected amount of example ions varies according to variation of the analysis conditions even in analyzing the same analysis target. Generally, each of the components included in one analysis target can be more effectively separated by increasing the electric field intensity. However, as the separation of the components is promoted, the concentration of example ions detected under the analysis conditions decreases and the sample ions are less likely to be detected. With the filter gap being too small, an electric discharge or turbulent air flow are likely to occur in the space between the first filter electrode 21 and the second filter electrode 22. Therefore, the filter gap is preferably about 20 µm or more (typically, 50 µm or more) and about 5 mm or less (typically, 1 mm or less).

Material of the filter electrodes 21, 22 is not particularly limited. Various kinds of electrically conductive materials may be used for the filter electrodes 21, 22 as long as the material can create an electric field between the electrodes. Metal material, inorganic electrically conductive material, and organic electrically conductive material may be used. With an example to be analyzed and ions included in the example having metal corrosive properties, inorganic electrically conductive material or organic electrically conductive material may be preferably used as the electrically conductive material of the surfaces of the filter electrodes 21, 22. The metal material of the filter electrodes 21, 22 is not particularly limited. In producing the filter electrodes 21, 22 with the lithography technology using ArF excimer laser, one kind or an alloy of one kind selected from highly electrically conductive metals including copper (Cu), titanium (Ti), aluminum (Al), chrome (Cr), molybdenum (Mo), tantalum (Ta), and tungsten (W) or an alloy of two or more kinds selected from the highly electrically conductive metals may be used. The metal material may be disposed in layers of W/Ta, Ti/Al, Ti/Al/Ti or Cu/Ti from an upper layer to increase physical properties such as adhesiveness with respect to a base member (the substrate in this embodiment). Examples of the inorganic electrically conductive material include indium tin oxide (ITO), indium-zinc-oxide (IZO), and indium-gallium-zinc-oxide (IGZO). Examples of the organic electrically conductive material include polyacetylene and polythiophenes. The filter electrode 21, 22 may include two or more of the metal material, the inorganic electrically conductive material, and the organic electrically conductive material that are disposed on top of each other.

The first potential adjustment section 23 is a component that creates and adjusts a potential difference between the filter electrodes 21, 22. With the first potential adjustment section 23 creating a potential difference (a filter voltage) between the filter electrodes 21, 22, an electric field is created between the filter electrodes 21, 22. The ion mobility is constant in a low electric field regardless of the electric field intensity; however, the ion mobility changes according to the electric field intensity in a high electric field. The first potential adjustment section 23 typically includes a variable voltage generator such as a pulse voltage generator and is configured to generate a voltage having a waveform illustrated in FIG. 4. The filter voltage applied between the filter electrodes 21, 22 is a bipolar pulse voltage that is able to have positive and negative polarities. The potential of a positive polarity and the potential of a negative polarity are typically switched asymmetrically. A voltage waveform is an asymmetric pulse waveform that alternately includes a period $T_H$ during which a voltage level is a high voltage level $V_H$ that creates a high electric field and a period $T_L$ during which a voltage level is a low voltage level $V_L$ that creates a low electric field. In such a voltage waveform, a voltage at the high voltage level $V_H$ is referred to as the dispersion voltage (DV). The low voltage level $V_H$ is determined to have a polarity different from that of the dispersion voltage such that the waveform is symmetric with respect to the dispersion voltage and the time-averaged voltage is zero.

Figure 5:
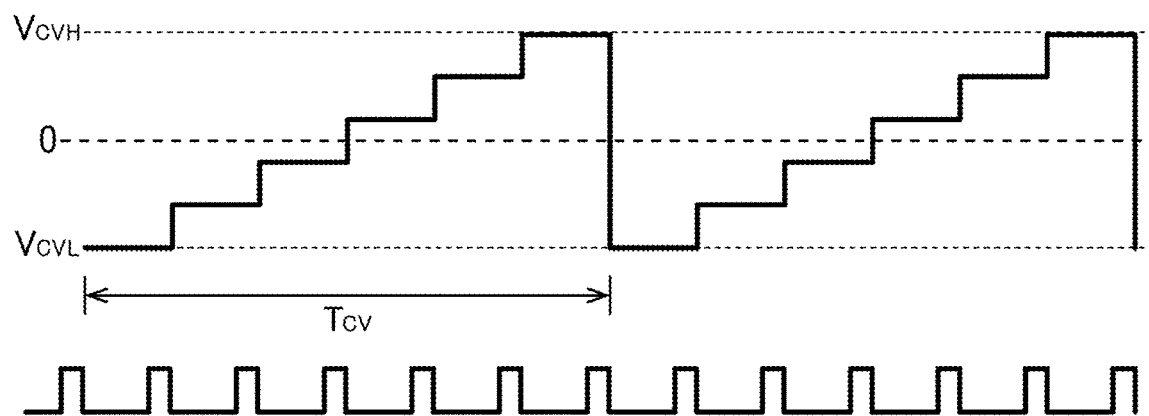

A flow of buffer gas (neutral) including the example ions is created at a constant speed in the ion separation space between the filter electrodes 21, 22. With the first potential adjustment section 23 applying a voltage of the high voltage level $V_H$, a high electric field is created in the ion separation space. With the first potential adjustment section 23 applying a voltage of the low voltage level $V_L$, a low electric field is created in the ion separation space. The high electric field and the low electric field have different polarities. With the example ions being transferred to the environment in which the asymmetric electric fields are alternately created, the example ions are attracted by the first filter electrode 21 and the second filter electrode 22 alternately and move in a zig-zag manner. The example ions that are directed and move toward the first filter electrode 21 or the second filter electrode 22 collide with the first filter electrode 21 or the second filter electrode 22 and cannot pass through the space between the filter electrodes 21, 22. Only the example ions that are kept in balance between the first filter electrode 21 and the second filter electrode 22 pass through the space between the filter electrodes 21, 22 and can reach the detection section 30 that is on a downstream side. The ion type that passes through the space between the filter electrodes 21, 22 can be determined by the compensation voltage (CV) applied to superimpose the dispersion voltage between the filter electrodes 21, 22. The ion type that passes through the space can be changed by changing the voltage value to be applied as illustrated in FIG. 5. The compensation voltage may be changed at a certain period $T_{CV}$.

With respect to the filter voltage, the high voltage level $V_H$ is a voltage with which ions of the components included in the analysis target can be separated for every component based on the mobility and the high voltage level $V_H$ may be changed according to the component type and a combination of the components. Therefore, the high voltage level $V_H$ is preferably set to create a high electric field of 5000 V/cm or more with which the nonlinearity of the mobility is caused, and more preferably set to create a high electric field of 20000 V/cm or more. The high voltage level $V_H$ is not necessarily limited to the above range. The high voltage level may be set such that a potential difference of +200V or more (−200V or less in the opposite polarity), preferably +500V or more (−500V or less in the opposite polarity) can be created when the gap between the filter electrodes 21, 22 is 0.1 mm. A relation between the high voltage level $V_H$ and the low voltage level $V_L$ is typically $|V_L|<|V_H|$ and a time period $T_H$ of the high voltage level $V_H$ can be shorter than a time period Ti of the low voltage level $V_L$. A repetition cycle period ($T_H+T_L$) of the high voltage level $V_H$ and the low voltage level $V_L$ is typically 1 KHz or more, and 0.1 MHz or more for example, and typically 100 MHz or lower, and 30 MHz or lower, for example. The repetition cycle period is not necessarily limited to the above range. One example of the filter voltage may be set such that a duty ratio of the high voltage level $V_H$ is about 20% to 40% and a voltage ratio of the high voltage level $V_H$ and the low voltage level $V_L$ ($|V_L|/|V_H|$) is about ¼ to ⅔.

The detection section 30 is a component for detecting the amount of example ions that pass through the ion filter section 20. The detection section 30 includes the first substrate 31, the second substrate 32, a collector electrode 33, a deflection electrode 37, a detection circuit 38, and a second potential adjustment section 39.

The first substrate 31 is a component that supports the collector electrode 33. As previously described, in this embodiment, the first filter electrode 21 and the collector electrode 33 are disposed on the first substrate 31 with having a space therebetween. The second substrate 32 is a component that supports the deflection electrode 37. In this embodiment, the second filter electrode 22 and the deflection electrode 37 are disposed on the second substrate 32 with having a space therebetween. The first substrate 31 and the second substrate 32 are disposed such that surfaces on which the electrodes are disposed are opposite each other. In the following, with the first substrate 31 and the second substrate 32 being not necessary to be distinguished each other, they are generally referred to as substrates 31, 32. The substrates 31, 32 of this embodiment are flat plates having an elongated rectangular shape. A gas transfer direction set by the pump P is defined such that the example ions move in an elongated direction of the substrates 31, 32. The filter electrodes 21, 22 are disposed on upstream side portions of the substrates 31, 32 and the collector electrode 33 and the deflection electrode 37 are disposed on downstream side portions of the substrates 31, 32. The shape of the substrates 31, 32 is not particularly limited as long as the first filter electrode 21 and the second filter electrode 22 can be supported parallel to each other with having a predefined gap and the collector electrode 33 and the deflection electrode 37 can be supported parallel to each other with having a predefined gap.

The substrates 31, 32 of this embodiment may be made of various kinds of insulation materials having insulation properties. One example of the insulation material has a volume resistivity of $10^7$ Ωcm or more (for example, $10^{10}$ Ωcm or more, $10^{12}$ Ωcm or more, $10^{15}$ Ωcm or more) at a room temperature (25° C., for example). For example, organic material or inorganic material having the volume resistivity of the above range may be used as the insulation material. Although it is not limited thereto, the substrates 31, 32 are flat glass plates in this embodiment because the electrodes can be preferably formed on the substrates 31, 32 with the lithography technology. The thicknesses of the substrates 31, 32 are not particularly limited and may be about 0.1 mm to 1 mm (0.5 mm or 0.7 mm, for example).

The collector electrode 33 is a component that receives electric charges by the contact with the example ions that are transferred to the detection section 30. The collector electrode 33 includes a lower electrode layer 34, an insulation layer 35, and an upper electrode layer 36 in this order from the first substrate 31 side. The upper electrode layer 36 is uncovered and has a collection surface 36A that is configured as a surface of the collector electrode 33 and opposite the deflection electrode 37. The example ions are received on the collection surface 36A. The lower electrode layer 34 of this embodiment is disposed closer to the first substrate 31 than the upper electrode layer 36 is and is connected to the detection circuit 38. The upper electrode layer 36 is insulated from the lower electrode layer 34 by the insulation layer 35 that is between the upper electrode layer 36 and the lower electrode layer 34. In other words, the collector electrode 33 has a capacitor structure. With the upper electrode layer 36 and the lower electrode layer 34 including a metal material layer, the collector electrode 33 has a so-called MIM structure.

With such a configuration, the detection circuit does not immediately detect ion current or ion intensity from the example ions received on the collection surface 36A of the collector electrode 33 but the upper electrode layer 36 stores charges of the collected example ions. Accordingly, the upper electrode layer 36 is charged positive (+) or negative (−) according to the collected charge amount. Then, the lower electrode layer 34 is charged negative (−) or positive (+) to be opposite from the upper electrode layer 36 to balance the potential difference with respect to the upper electrode layer 36. In this embodiment, the detection circuit 38 detects the charge amount of the charges of the lower electrode layer 34 and the charge amount of charges of the upper electrode layer 36, that is, the amount of example ions collected by the upper electrode layer 36 can be obtained. The upper electrode layer 36 is insulated (shielded) from the lower electrode layer 34 and the first substrate 31 by the insulation layer 35. Therefore, the charge amount of the upper electrode layer 36 is not influenced by the electric field and the amount of example ions detected by the detection circuit 38 does not include a noise caused by the electric field. As a result, signals related to the amount of example ions detected by the detection circuit 38 are transferred to the control section 40 with reduced noise. This increases detection accuracy of detecting a component of a low concentration.

Figure 6:
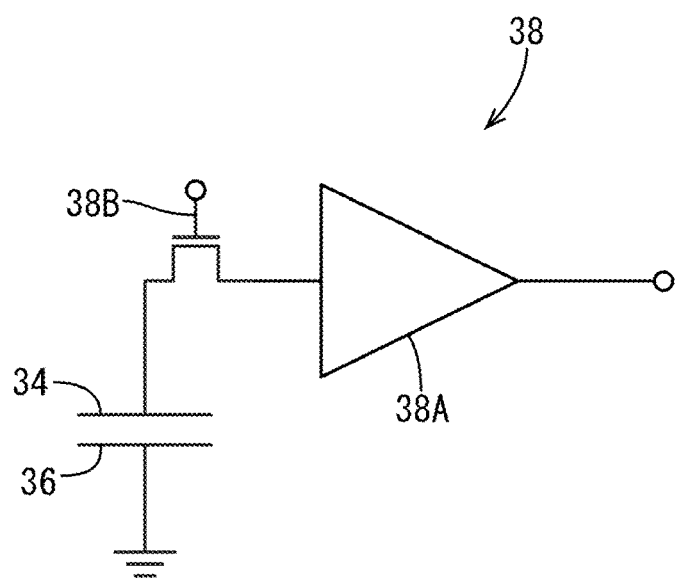

As illustrated in FIG. 6, the detection circuit 38 may include an amplifier 38A and a switching circuit 38B. The amplifier 38A is a component that amplifies signals related to the charge amount of the lower electrode layer 34 and may include a known amplifier circuit. The switching circuit 38B is between the lower electrode layer 34 and the amplifier 38A and is a component that switches connection and disconnection (ON and OFF) between the lower electrode layer 34 and the amplifier 38A. The switching circuit 38B can adjust the time period for storing charges on the lower electrode 34 (the capacitor electrode). The switching circuit 38B may include a known switching circuit (for example, a thin film transistor (TFT)). In this embodiment, the lower electrode layer 34 is connected to a source electrode of the TFT, and a drain electrode of the TFT is connected to an input terminal of the amplifier 38A, and an output terminal of the amplifier is connected to an input terminal (not illustrated) of the control section 40. A gate electrode of the TFT, which is not illustrated in FIG. 6, is connected to the control section 40 and the control section 40 can switch ON and OFF of the TFT. With such a configuration, when the amount of example ions is small, an interval between measurements of the charges stored on the lower electrode layer 34 can be set longer. Thus, charges can be detected after charges are stored for a longer time. Accordingly, even if the concentration of example ions is low, a result of no detection (ND) is less likely to be caused.

The deflection electrode 37 is a component that makes example ions to head for the collector electrode 33 such that the example ions that are transferred to the detection section 30 are collected by the collector electrode 33. The deflection electrode 37 of this embodiment is connected to the second potential adjustment section 39 and is configured to create an electric field, which can make example ions to head for the collector electrode 33, between the collector electrode 33 and the deflection electrode 37.

Thicknesses of the upper electrode layer 36, the lower electrode layer 34, and the deflection electrode 37 may be different from each other and about 1 µm or less, and typically 600 nm or less, and for example, 500 nm or less, 400 nm or less, and 200 nm or less. Thicknesses of the upper electrode layer 36 and the lower electrode layer 34 may be different from each other and about 10 nm or more, and typically 50 nm or more, and for example, 100 nm or more. Material and configurations of the upper electrode layer 36, the lower electrode layer 34, and the deflection electrode 37 may be similar to those of the filter electrodes 21, 22 previously described.

The second potential adjustment section 39 is a component that adjusts and applies a potential difference between the collector electrode 33 and the deflection electrode 37. The second potential adjustment section 39 is connected to the deflection electrode 37 and applies a potential to the deflection electrode 37. The second potential adjustment section 39 adjusts a potential of the deflection electrode 37 to be high with respect to the collector electrode 33 if the example ions transferred to the detection section 30 are positive ions and adjusts the potential of the deflection electrode 37 to be low with respect to the collector electrode 33 if the example ions transferred to the detection section 30 are negative ions.

The control section 40 is connected to the first potential adjustment section 23, the second potential adjustment section 39, and the detection circuit 38. The control section 40 is configured to control operations of the first potential adjustment section 23 and the second potential adjustment section 39 and store the amount of example ions that are detected by the detection circuit 38. The control section 40 of this embodiment is further configured to control an operation of the ionization source 10 and switch the polarity of the example ions that are generated by the ionization source 10 between positive ions and negative ions.

The control section 40 is configured as a microcomputer including an interface (I/F) that transmits and receives various kinds of information, a central processing unit (CPU) that executes instructions of a control program, a read only memory (ROM) that stores programs that are executed by the CPU, a random access memory (RAM) that is used as a working area for developing a program, a storing section M that stores various kinds of information, and a timer T having a clocking function. The ROM stores computer programs that are used to apply a voltage to each of the first potential adjustment section 23 and the second potential adjustment section 39, computer programs that are used to perform various kinds of analysis processing based on a database, a table, and the detected amount of example ions, a database, and a table. The ROM is not necessarily limited thereto. The storing section M stores ID information of an analysis target, the amount of example ions detected by the detection circuit 38, information used for the various kinds of analysis processing, and information related to analysis results.

Figure 7:
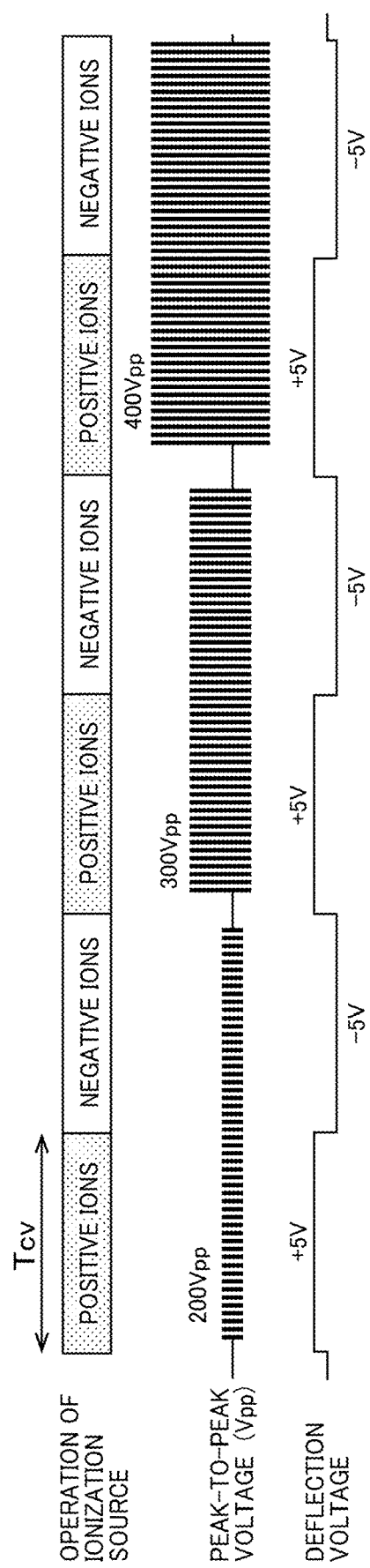

FIG. 7 illustrates a portion of a control timing chart when the control section 40 controls an operation of each section of the mobility analyzer 1. The control section 40 of this embodiment controls the first potential adjustment section 23 to create the potential difference having a waveform illustrated in FIGS. 4 and 5 between the filter electrodes 21, 22 under the conditions described below. The potential difference between the high electric field level and the low electric field level of the filter electrodes ($V_H$–$H_L$, that is, a peak-to-peak voltage between positive and negative: Vpp) may be increased sequentially from 100V to 500V, for example, as illustrated in FIG. 7. In scanning the peak-to-peak voltage (distributed voltage), the peak-to-peak voltage may be varied stepwise at a certain period cycle. In FIG. 7, some of the voltages that are increased stepwise (for example, 400V and 500V) are not illustrated. A duty ratio represents a ratio of the period $T_H$ of the high electric field to the repetition cycle period and is calculated by a following formula: $T_H/(T_H+T_L) \times 100$ [%]. With respect to the operation of the ionization source 10, the time period while positive ions are generated and the time period while negative ions are generated are equal to a switching cycle period $T_{CV}$ of the compensation voltage CV illustrated in FIG. 5.

Example ions that pass through the space between the filter electrodes 21, 22 are stored on the upper electrode layer 36 of the collector electrode 33 and thereafter, detected. Therefore, in the detector device 50 of the present technology, the control section 40 changes the compensation voltage CV stepwise with several steps between a positive sweep voltage $V_{CVH}$ and a negative sweep voltage $V_{CVL}$ in every switching cycle period $T_{CV}$ to keep the time for storing example ions on the upper electrode layer 36. In the example illustrated by FIG. 5, the compensation voltage CV is increased stepwise with five steps. The FAIMS detector device of a prior art, which is not specifically illustrated, differs from the present technology in that the compensation voltage is changed smoothly (linearly) between the positive sweep voltage $V_{CVH}$ and the negative sweep voltage $V_{CVL}$. The control section 40 controls the switching circuit 38B to be ON at the timing when example ions are stored on the upper electrode layer 36 and the amount of example ions stored on the upper electrode layer 36 can be detected. The switching circuit 38B may be instantly (for example, for a few milliseconds) ON at the timing that (before) the compensation voltage CV is changed stepwise, for example. Accordingly, the amount of example ions (that is, the amount of example ions having predetermined mobility) under the voltage application conditions including the dispersion voltage DV and the compensation voltage CV can be obtained. One example of control by the control section 40 under the voltage application condition will be described below.

Dispersion Voltage (DV)
   Peak-to-peak voltage (Vpp): changes from 100V to 500V by 100V
   Repetition cycle period ($T_H+T_L$): 1 MHZ
   Duty ratio: 30%
Compensation Voltage (CV)
   Sweeping cycle period $T_{CV}$: 1 s
   Positive sweep voltage $V_{CVH}$: +20V
   Negative sweep voltage $V_{CVL}$: −20V
   Increases stepwise with five steps
Connection of Collector Electrode and Detection Circuit
   Connect instantly at the timing before increasing the compensation voltage With respect to the mobility analyzer 1, a method of producing the ion filter section 20 and the detection section 30 will be described below. In the detection section 30 according to the present technology, the collector electrode 33 and the switching circuit 38B have a layered structure of thin films as previously described. As illustrated in FIGS. 8A to 8E, the ion filter section 20 and the detection section 30 are preferably produced with the lithography technology (for example, photolithography).

Figure 8A:
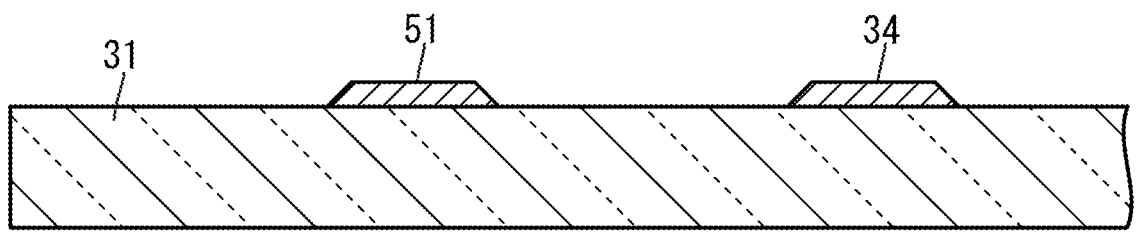

As illustrated in FIG. 8A, a gate electrode 51 is formed on the first substrate 31 that is a glass substrate. The gate electrode 51 is included in an inverted staggered TFT of the switching circuit 38B. The lower electrode layer 34 of the collector electrode 33 may be formed with the same material as the gate electrode 51 and at the same time as the gate electrode 51 is formed. The gate electrode 51 and the lower electrode layer 34 are formed by depositing a Mo-layer with a thickness of 100 nm to 600 nm with the sputtering method and patterning the layer into a predefined form with the known photolithography method (through the photolithography process, the wet etching process, and the resist removing ad cleaning process). The material of the gate electrode and the lower electrode layer 34 may be other metal material such as Al, Cu, W, Ta, MoW. Furthermore, the gate electrode and the lower electrode layer 34 may have a layered structure of a combination of metal layers such as W/Ta, Ti/Al, Ti/Al/Ti, and Cu/Ti from an upper layer side to increase adhesiveness.

Figure 8B:
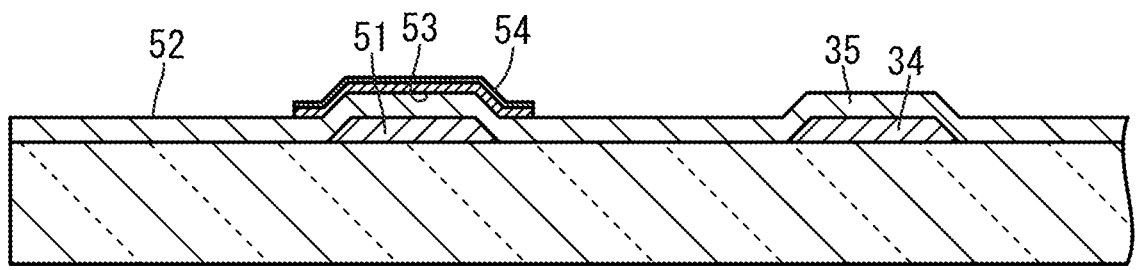

Next, as illustrated in FIG. 8B, a SiNx layer, which is an example of a gate insulation layer 52, an amorphous Si layer, which is an example of a channel layer 53, and a n+amorphous Si layer (amorphous Si to which n-type impurities are doped in a high concentration), which is an example of an electrode contact layer 54, are disposed on top of each other in this order. The insulation layer 35 of the collector electrode 33 may be formed at the same time and in the same process as the gate insulation layer 52 is formed and formed from the same material as that of the gate insulation layer 52. The layers may be formed with the CVD method such that the gate insulation layer 52 and the insulation layer 35 have a thickness of about 100 nm to 500 nm, the channel layer 53 has a thickness of about 30 nm to 300 nm, and the electrode contact layer 54 has a thickness of about 50 nm to 150 nm. The channel layer 53 and the electrode contact layer 54 may be patterned into a predefined form with the known photolithography method (through the photolithography process, the dry etching process, and the resist removing and cleaning process).

Figure 8C:
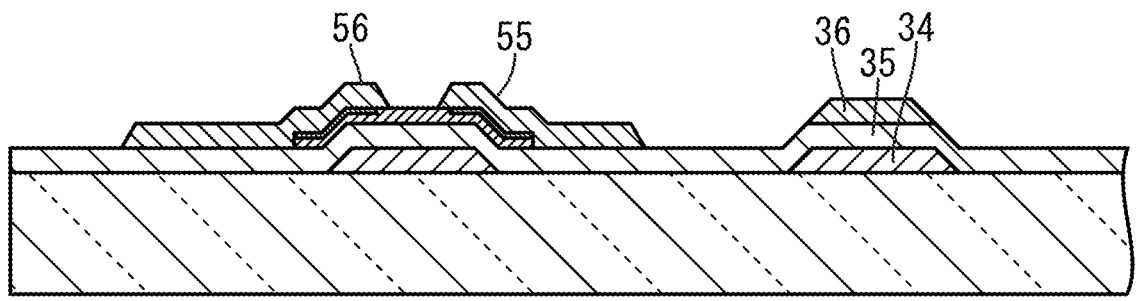

Then, as illustrated in FIG. 8C, a source electrode 55 and a drain electrode 56 are formed. The upper electrode layer 36 of the collector electrode 33 may be formed at the same time and in the same process as the source electrode 55 is formed and formed from the same material as that of the source electrode 55. The source electrode 55, the drain electrode 56, and the upper electrode layer 36 may be formed by depositing a metal layer of Al or Mo with a thickness of 200 nm to 400 nm with the sputtering method and patterning the layer into a predefined form with the known photolithography method (through the photolithography process, the dry etching process, and the resist removing and cleaning process). The source electrode 55, the drain electrode 56, and the upper electrode layer 36 may have a layered structure of a combination of metal layers or alloy layers such as Ti/Al, Ti/Al/Ti, Al/Ti, TiN/Al/TiN, Mo/Al, Mo/Al/Mo, Mo/AlNd/Mo, MON/Al/MON from an upper layer side to increase adhesiveness and contact resistance.

Figure 8D:
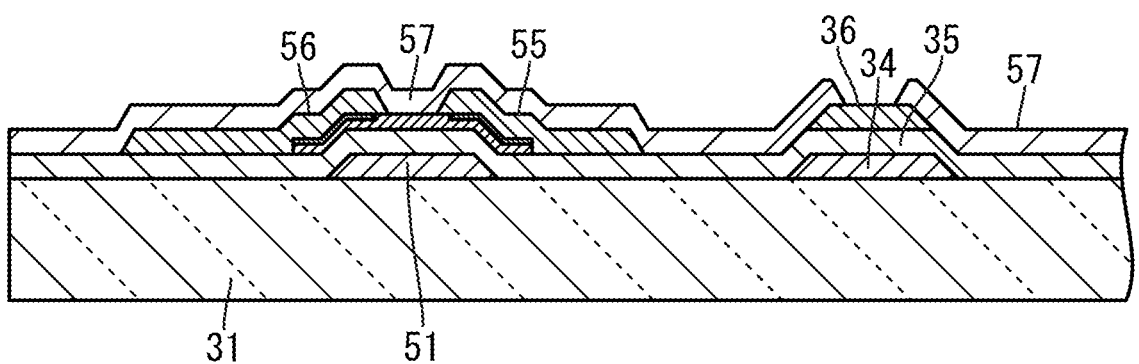

Next, as illustrated in FIG. 8D, a protection layer 57 is formed. The protection layer 57 may be formed by depositing a SiNx layer with a thickness of 100 nm to 500 nm with the CVD method and patterning the layer into a predefined form with the known photolithography method (through the photolithography process, the dry etching process, and the resist removing ad cleaning process). The protection layer 57 may be a single layer of SiNx layer or a single layer of $SiO_2$, or may be a layered structure having a combination of $SiNx/SiO_2$ from an upper layer side. Thus, the inverted staggered TFT is produced as the switching circuit 38B.

Figure 8E:
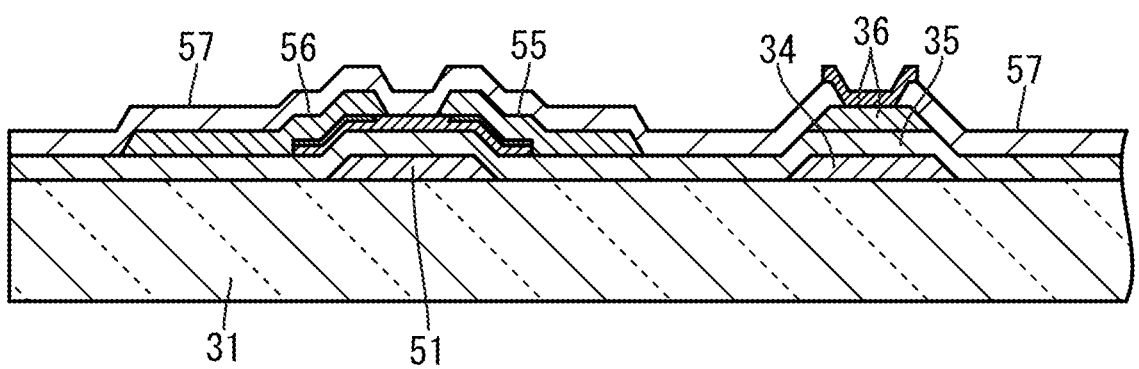

Thereafter, as illustrated in FIG. 8E, the upper electrode layer 36 of the collector electrode 33 is formed. The upper electrode layer 36 may be formed by depositing an IZO layer with a thickness of 50 nm to 200 nm with the sputtering method and patterning the layer into a predefined form with the known photolithography method (through the photolithography process, the wet etching process, and the resist removing and cleaning process). The upper electrode layer 36 may be produced with using other material such as ITO, Ti, Mo, W, Ta instead of using IZO. Thus, the collector electrode 33 is produced.

Figure 9:
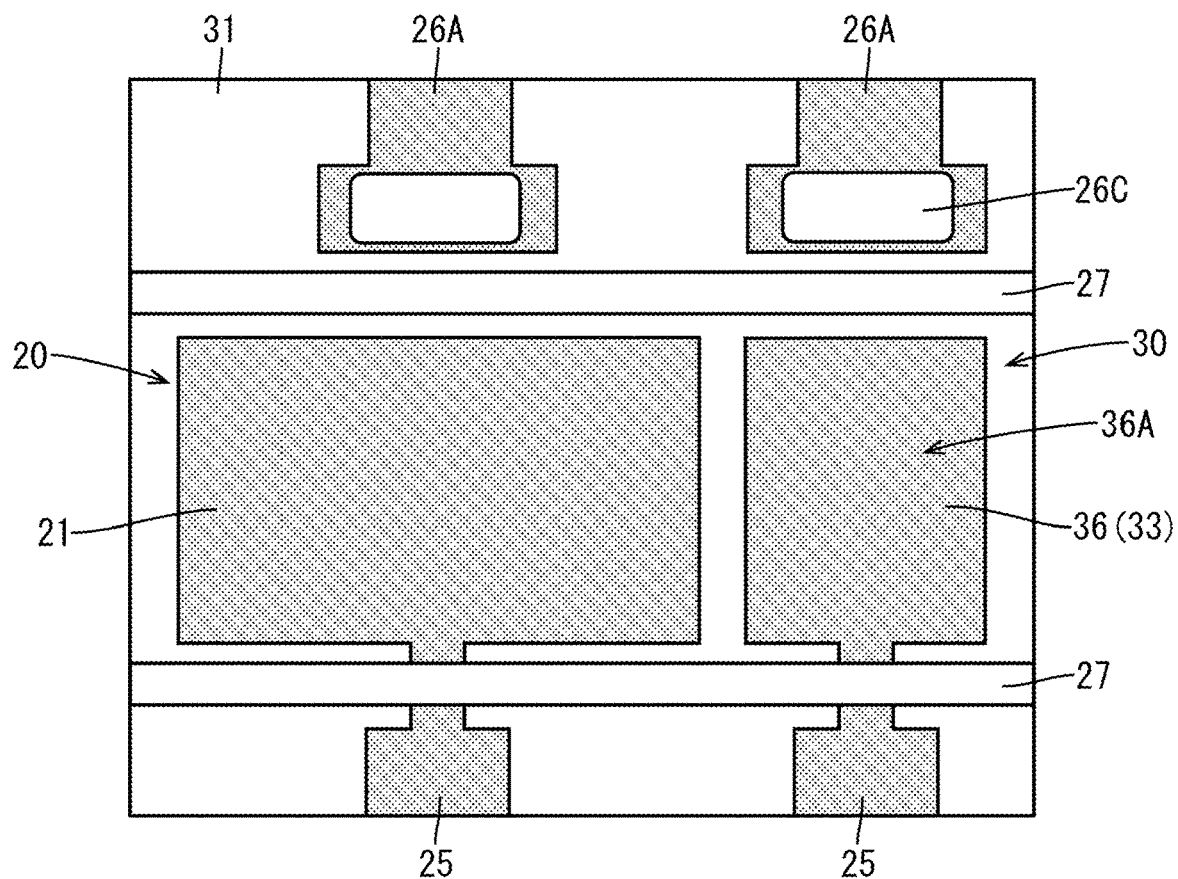

The first filter electrode 21 of the ion filter section 20 may be formed in the same process in which the upper electrode layer 36 of the collector electrode 33 is formed. The first filter electrode 21 may be formed in a portion where the protection layer 57 is etched so as to be contacted with the source electrode 55 of the TFT. Furthermore, as illustrated in FIG. 9, external connection terminals 25 and second substrate external connection terminals 26A may be formed in the same process in which the first filter electrode 21 and the upper electrode layer 36 are formed. The external connection terminals 25 connect the first filter electrode 21 and the upper electrode layer 36 to the first potential adjustment section 23 and the second potential adjustment section 39, respectively, which are outside the first substrate 31. The second substrate external connection terminals 26A connect the second filter electrode 22 and the deflection electrode 37 to external circuits.

The collector electrode 33 may not be formed in the same process in which the TFT is formed as previously described. The lower electrode layer 34 may be formed in the same process in which the first filter electrode 21 is formed and subsequently the insulation layer 35 and the upper electrode layer 36 may be disposed on the lower electrode layer 34. The processes may not be specifically illustrated. The layers (the upper electrode layer 36, the insulation layer 35, and the lower electrode layer 34) of the collector electrode 33 may be formed in the same process in which the layers of the TFT are formed. For example, the upper electrode layer 36, the gate insulation layer 52 (the insulation layer 35), the gate electrode 51 (the lower electrode layer 34) may be formed in this order from the upper layer side. The source electrode (the upper electrode layer 36), the gate insulation layer 52 (the insulation layer 35), the gate electrode 51 may be formed in this order from the upper layer side. The upper electrode layer 36, the protection layer 57 and the gate insulation layer 52 (the insulation layer 35), the gate electrode 51 may be formed in this order from the upper layer side. The TFTs may be formed as a component of a peripheral circuit such as a gate driver, a source driver, and the amplifier 38A at the same time as the TFT is formed as the switching circuit 38B.

Figure 10:
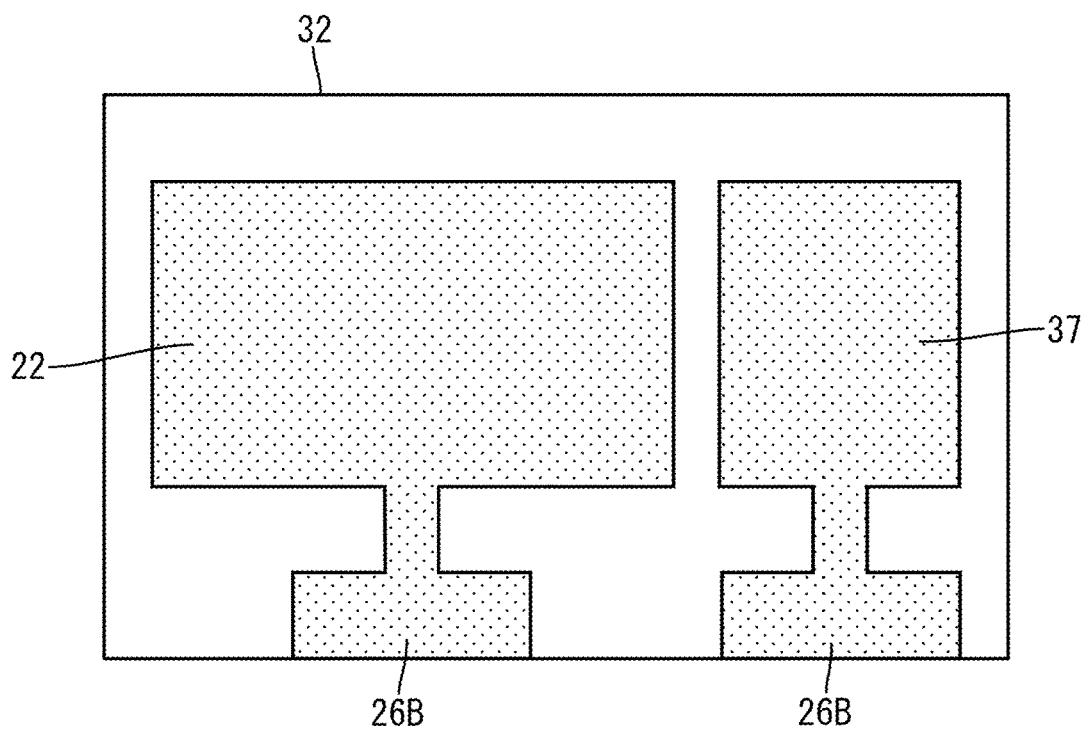

As illustrated in FIG. 10, the second filter electrode 22 and the deflection electrode 37 are formed on the second substrate 32 that is a glass substrate. The second filter electrode 22 and the deflection electrode 37 are formed with the same method and the same conditions as those of the upper electrode layer 36, for example. External connection terminals 26B may be formed continuously from the second filter electrode 22 and the deflection electrode 37, respectively, on the second substrate 32. The external connection terminals 26B are connected to the respective second substrate external connection terminals 26A that are formed on the first substrate 31. In this embodiment, the second substrate 32 has a planar shape that is slightly smaller than a planar shape of the first substrate 31 such that at least a portion of each of the external connection terminals 25 and a portion of each of the second substrate external connection terminals 26A are not covered with the second substrate 32 and are exposed outside.

Figure 11:
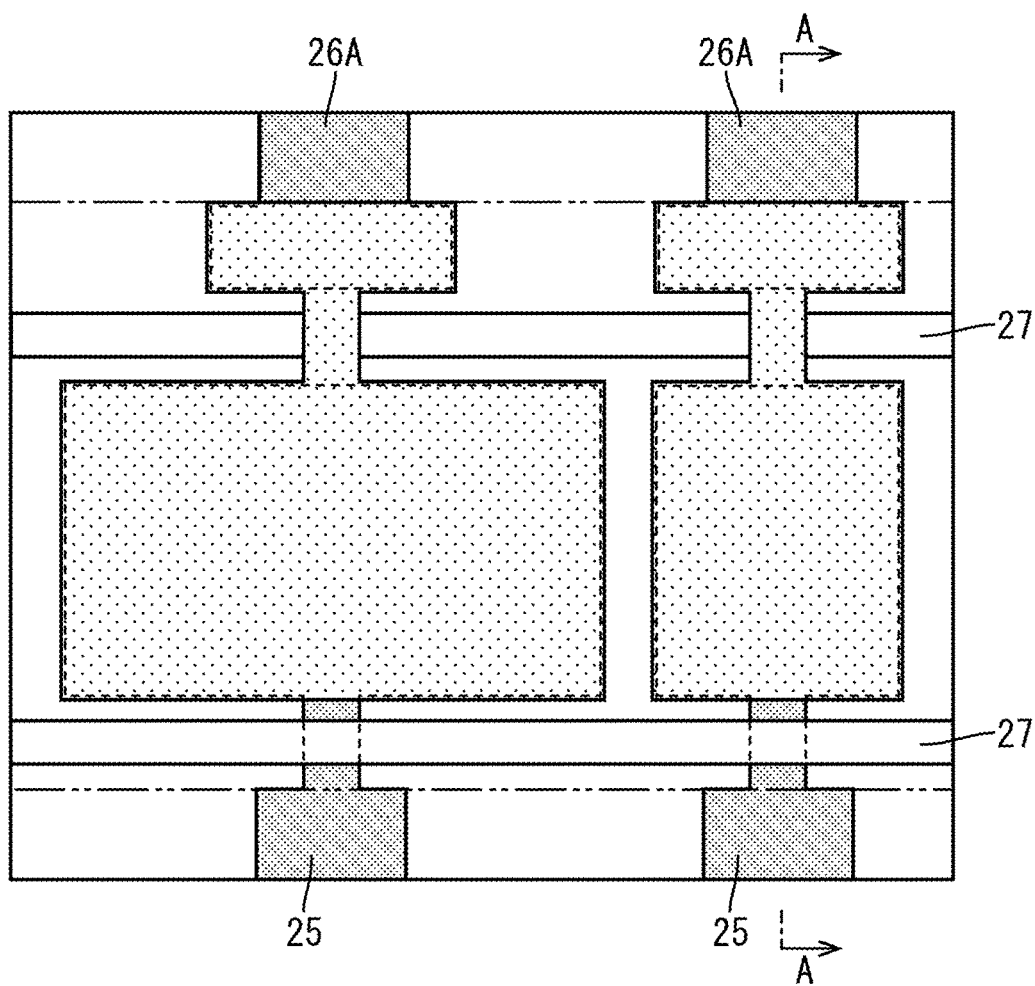
Figure 12:
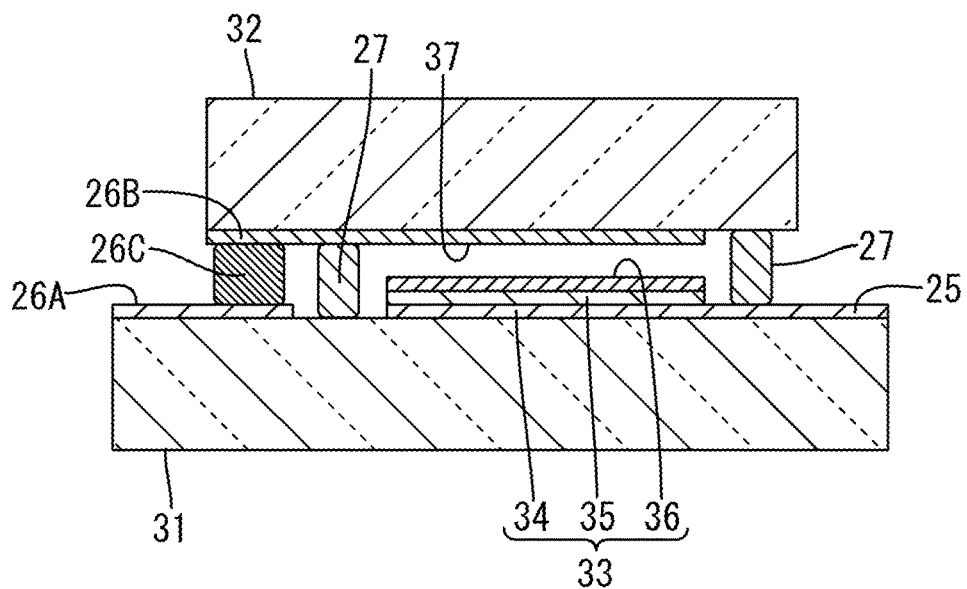

Then, the first substrate 31 and the second substrate 32 on which the electrodes are formed are bonded to each other. In bonding the substrates 31, 32, as illustrated in FIG. 9, insulation sealing material (for example, resin composition that is curable by drying) is supplied to two portions on the first substrate 31 by supply means such as a dispenser and the second substrate 32 is disposed on the first substrate 31 to be bonded together. Spherical beads made of plastic material or glass and having a diameter of 50 μm to 500 μm may be mixed with the sealing material to keep a gap between the first substrate 31 and the second substrate 32 to be a predefined dimension. The sealing material and the spherical beads function as spacers 27 after the sealing material is cured and the spacers 27 define a distance between the first substrate 31 and the second substrate 32. To surely connect the second substrate external connection terminals 26A on the first substrate 31 and the external connection terminals 26B on the second substrate, electrically conductive paste 26C (for example, silver paste) may be disposed on the connection portions. Accordingly, as illustrated in FIGS. 11 and 12, the detector device 50 described herein is produced.

The spacers 27 are not necessarily limited to the cured sealing material described above but a double-sided adhesive tape or a synthetic resin member having a predefined thickness may be used as the spacer 27. The first substrate 31 and the second substrate 32 that have a size greater than the size of one single detector device may be prepared and arrays of the electrode layers may be formed on the first substrate 31 and the second substrate 32. Such first substrate 31 and the second substrate 32 may be bonded to each other and divided into several detector devices 50. The substrates may be divided into the detector devices 50 with contact processing using a dicing cutter or noncontact processing using laser. The first substrate 31 and the second substrate 32 may be divided before the bonding of the first substrate 31 and the second substrate 32.

Configuration and Effects of First Embodiment

The detector device 50 described above includes a pair of filter electrodes 21, 22 that are disposed opposite each other, the collector electrode 33 that collects example ions (charged particles) that have passed through a space between the filter electrodes 21, 22, and the detection circuit 38 that is connected to the collector electrode 33 and detects the amount of collected example ions. The collector electrode 33 includes the upper electrode layer 36 having the collection surface 36A that receives the example ions, the lower electrode layer 34 that is disposed opposite a surface of the upper electrode layer 36 that is an opposite surface from the collection surface 36A, and the insulation layer 35 that has insulation properties and is disposed between the upper electrode layer 36 and the lower electrode layer 34. The detection circuit 38 is configured to be connected to one of the upper electrode layer 36 and the lower electrode layer 34. According to such a configuration, the collector electrode 33 has a capacitor structure and the charges of the example ions received on the collection surface 36A of the upper electrode layer 36 are not detected by the detection circuit as an ion current or ion intensity but stored on the upper electrode layer 36. The lower electrode layer 34 is instantly charged with charges opposite from the charges of the upper electrode layer 36 to be balanced with respect to the upper electrode layer 36. Therefore, with the detection circuit 38 detecting the amount of charges of the lower electrode layer 34, the amount of charges of example ions received by the upper electrode layer 36 can be obtained. The amount of charges of the upper electrode layer 36 is not influenced by an electric field. Therefore, the mount of example ions detected by the detection circuit 38 does not include a noise caused by the electric field. As a result, a noise is reduced in the signals related to the amount of example ions detected by the detection circuit 38. This increases detection accuracy of detecting a component of a low concentration.

The detector device 50 further includes the first substrate 31 and the second substrate 32 that have insulating properties and a plate shape and are disposed opposite each other. The first filter electrode 21 and the collector electrode 33 are disposed on an opposing surface of the first substrate 31 with having a distance therebetween. The lower electrode layer 34 of the collector electrode 33 is contacted with the first substrate 31. The second filter electrode 22 and the deflection electrode 37 are disposed on an opposing surface of the second substrate 32 with having a distance therebetween. The example ions are deflected by the deflection electrode 37 to move toward the upper electrode layer 36 of the collector electrode 33. With such a configuration, the collector electrode 33 is disposed on the first substrate 31 that supports the first filter electrode 21 (one of the filter electrodes) of the pair of filter electrodes 21, 22. The example ions that pass through the space between the filter electrodes 21, 22 are deflected by the deflection electrode 37 on the second substrate 32 that supports the second filter electrode 22 (other one of the filter electrodes) so as to move toward the collector electrode 33. Accordingly, the ion filter section 20 and the detection section 30 can be formed on the pair of substrates 31, 32 and the detector device 50 can be obtained with a simple configuration.

In the detector device 50 described above, the distance between the first substrate 31 and the second substrate 32 is 1 mm or less. According to such a configuration, a high electric field can be created between the filter electrodes 21, 22 with a small voltage and the detector device 50 can be downsized.

In the detector device 50 described above, the thicknesses of the filter electrodes 21, 22, the upper electrode layer 36, and the lower electrode layer 34 may not be necessarily same and may be 1 µm or less. According to such a configuration, each of the electrodes can be formed efficiently with the lithography technology.

In the detector device 50 described above, at least surfaces of the filter electrodes 21, 22 and the upper electrode layer 36 that are to be contacted with example ions (charged particles) are made of IZO (inorganic electrically conductive material). Such a configuration is preferable in that the filter electrodes 21, 22 and the upper electrode layer 36 are less likely to be corroded. With the surfaces that are to be contacted with example ions (charged particles) being made of organic electrically conductive material such as polyacetylene and polythiophenes, the similar effects can be obtained.

In the detector device 50 described above, the detection circuit 38 includes the switching circuit 38B that switches a connection state with respect to the lower electrode layer 34 between connection and disconnection. According to such a configuration, timing of measuring the amount of charges of example ions (charged particles) that are stored by the collector electrode 33 can be controlled. As a result, for example, if the concentration of example ions is low and close to limit of detection, the concentration of charged particles can be detected at a timing when example ions are stored by the collector electrode 33.

The detector device 50 described above includes the first potential adjustment section 23 that applies a voltage between the filter electrodes 21, 22 and can change stepwise a potential difference between the filter electrodes 21, 22. The detection circuit 38 is configured to be connected to one of the upper electrode layer 36 and the lower electrode layer 34 at a timing when the first potential adjustment section 23 changes a potential difference between the filter electrodes 21, 22. More in detail, at a timing when the first potential adjustment section 23 changes a potential difference between the filter electrodes 21, 22, the control section 40 connects the upper electrode layer 36 and the detection circuit 38 via the switching circuit 38B. Accordingly, for example, if the concentration of example ions is low and close to the limit of detection, example ions (charged particles) can be stored by the collector electrode 33 with keeping the potential difference between the filter electrodes 21, 22 for a predetermined time. The amount of charges stored by the collector electrode 33 can be measured precisely before changing the potential difference.

Second Embodiment

Figure 13:
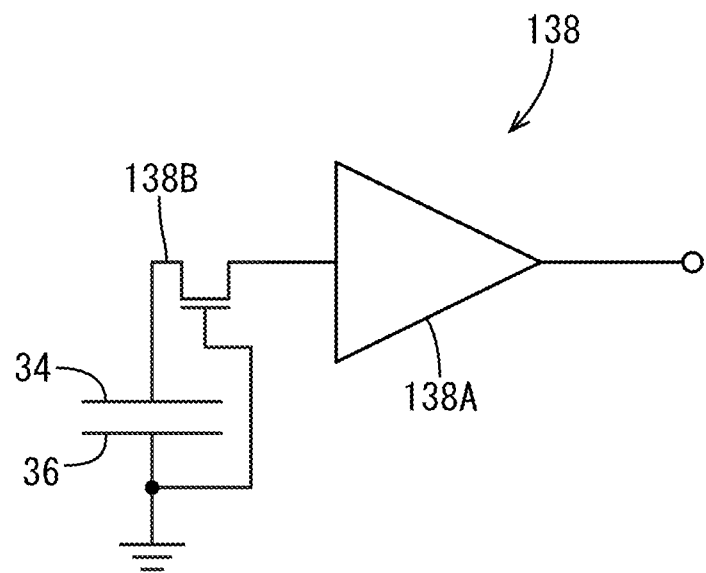
FIG. 13 a circuit diagram illustrating a configuration of a detection circuit according to another embodiment FIG. 14 a circuit diagram illustrating a configuration of a detection circuit according to another embodiment FIG. 15 a plan view illustrating one producing process of a detector device according to another embodiment FIG. 16 a cross-sectional view illustrating one producing process of the detector device according to another embodiment FIG. 17 a cross-sectional view illustrating one producing process of a detector device according to another embodiment FIG. 18 a plan view illustrating one producing process of a detector device according to another embodiment FIG. 19 a cross-sectional view along B-B line in FIG. 18

A detector device according to a second embodiment will be described with reference to FIG. 13. The second embodiment differs from the first embodiment in a configuration of a detection circuit 138 included in a detector device. Other configurations may be same as those of the first embodiment and the configurations, operations, and effects same as those of the first embodiment will not be described.

Specifically, the detection circuit 138 includes an amplifier 138A and a switching circuit 138B that is a TFT. In the detection circuit 138, a source electrode of the TFT is connected to the lower electrode layer 34 and a drain electrode of the TFT is connected to an input terminal of the amplifier 138A, and an output terminal of the amplifier 138A and the input terminal (not illustrated) of the control section 40 are connected. Grounding terminals on an input side and an output side of the amplifier 138A are not illustrated in FIG. 13. A gate electrode of the TFT is connected to the upper electrode layer 36. According to such a configuration, example ions are stored on the upper electrode layer 36 of the collector electrode 33. If a potential difference between the upper electrode layer 36 and the lower electrode layer 34 is a predefined threshold value or greater, a current automatically flows from the source electrode to the drain electrode (the TFT becomes ON). Namely, in the switching circuit 138B, the TFT becomes ON relatively in a short time if the concentration of example ions is relatively high and it takes longer for the TFT to become ON if the concentration of example ions is relatively low. In other words, the switching timing can be varied according to the concentration of example ions (charged particles). The ON and OFF switching potential $V_{TH}$ (threshold value) of the TFT can be controlled by adjusting the amount of doped impurities of n-type in the electrode contact layer although it is not necessarily limited thereto. The threshold potential may be preferably (for example, about 0.5V) higher than a potential of a noise caused by a voltage that is applied between the filter electrodes 21, 22 to create an electric field. Thus, detection accuracy of the detector device detecting a trace component can be increased.

Third Embodiment

Figure 14:
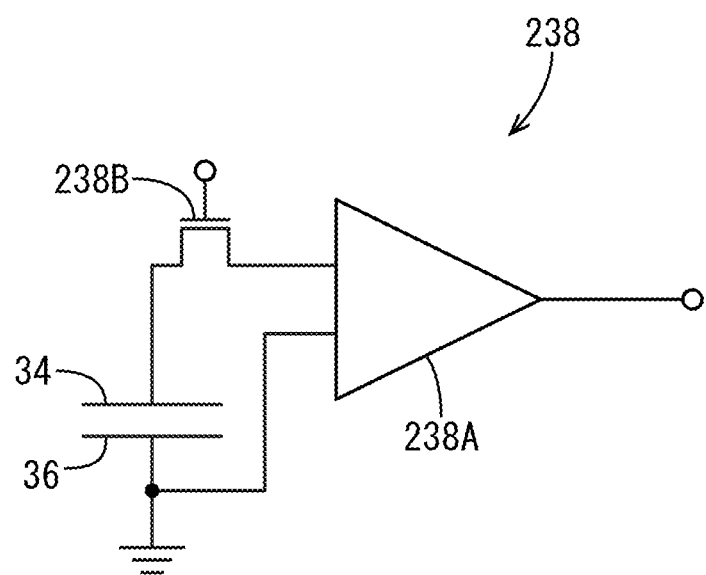

A detector device according to a third embodiment will be described with reference to FIG. 14. The third embodiment differs from the first embodiment and the second embodiment in a configuration of a detection circuit 238 included in a detector device. Other configurations may be same as those of the first embodiment and the second embodiment and the configurations, operations, and effects same as those of the first embodiment and the second embodiment will not be described.

Specifically, the detection circuit 238 includes an amplifier 238A that is an operational amplifier and a switching circuit 238B. In the detection circuit 238, a source electrode of a TFT is connected to the lower electrode layer 34, a drain electrode of the TFT is connected to a non-inverting input terminal of the operational amplifier, and an output terminal of the operational amplifier and an input terminal (not illustrated) of the control section 40 are connected to each other. An inverting input terminal of the operational amplifier is connected to the upper electrode layer 36. Although FIG. 14 does not illustrate, a gate electrode of the TFT is connected to the control section 40 and ON and OFF of the TFT can be switched by the control section 40. According to such a configuration, the TFT is normally OFF, and a potential difference between the upper electrode layer 36 and the lower electrode layer 34 can be amplified when the control section 40 switches ON the TFT. According to such a detection circuit 238, signals can be amplified selectively for the example ions of a small amount and such example ions can be detected without being cancelled by a noise.

Fourth Embodiment

Figure 15:
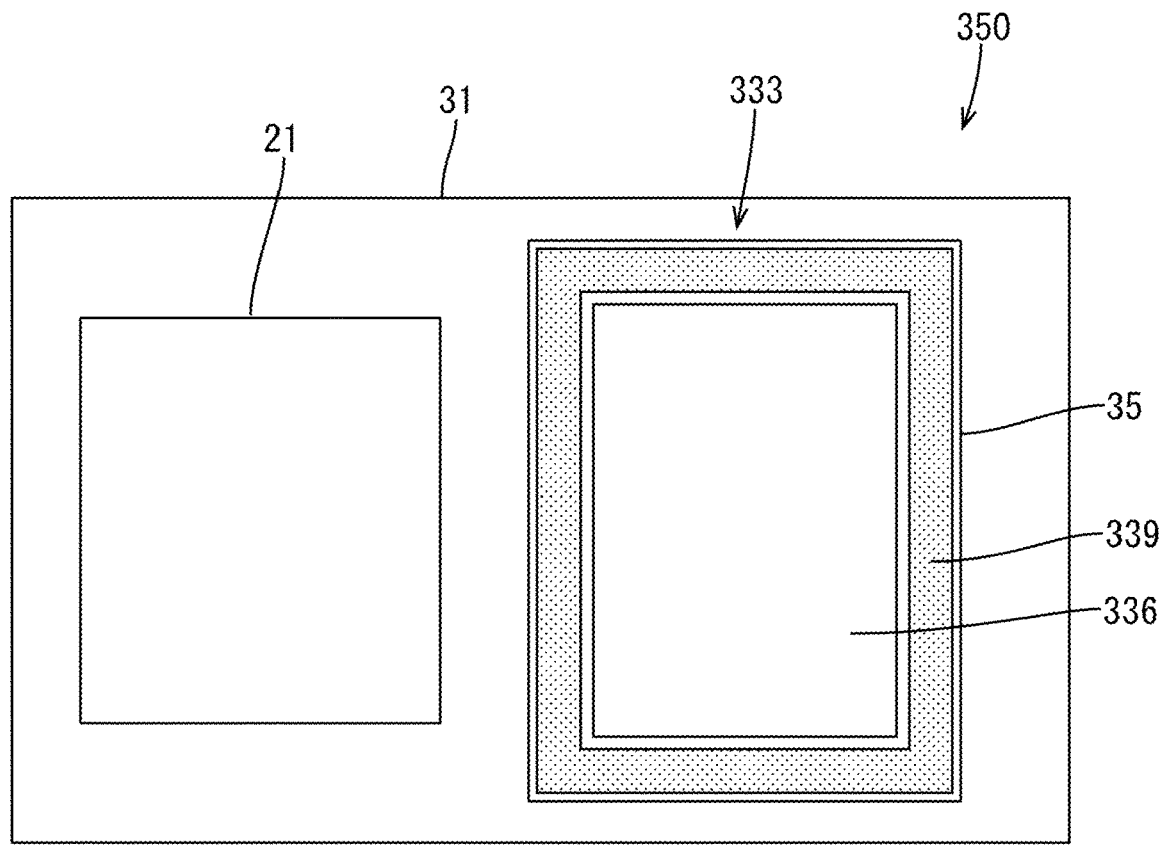
Figure 16:
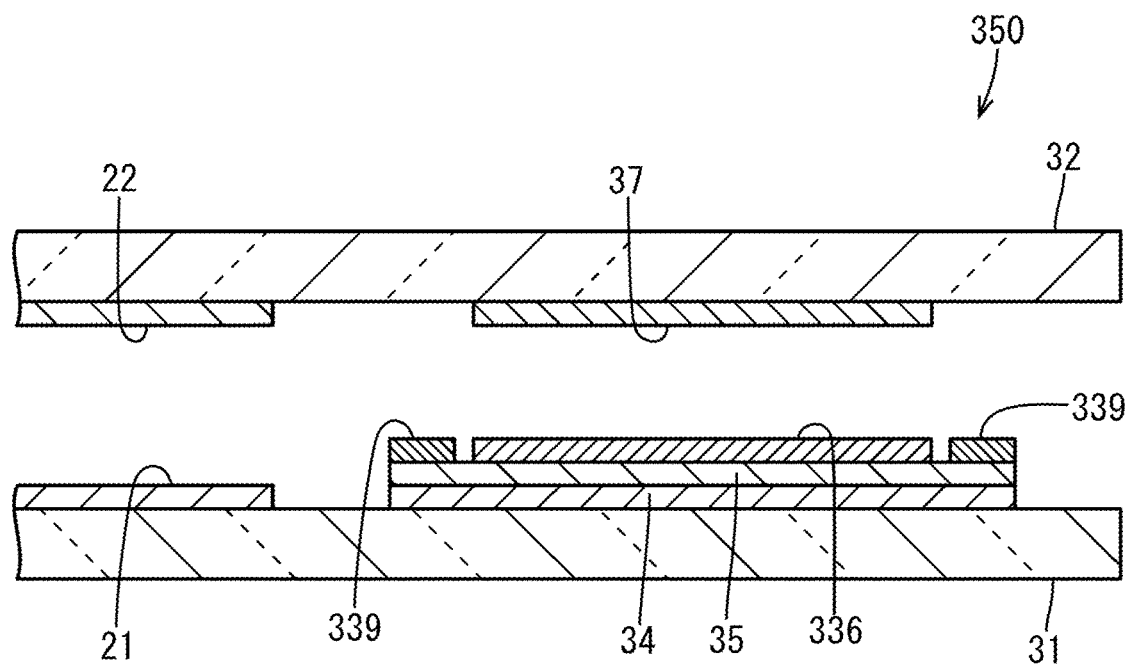

A detector device 350 according to a fourth embodiment will be described with reference to FIGS. 15 and 16. The fourth embodiment differs from the first to third embodiments in a configuration a collector of electrode 333. Other configurations may be same as those of any of the first to third embodiments and the configurations, operations, and effects same as those of any of the first to third embodiments will not be described.

Specifically, the collector electrode 333 includes an upper electrode layer 336 and a shield electrode layer 339 on a surface of the insulation layer 35 (a surface opposite the second substrate 32). The upper electrode layer 336 is disposed in a middle area of the surface of the insulation layer 35 except for a peripheral portion. The shield electrode layer 339 is disposed in the peripheral portion of the surface of the insulation layer 35 and extends to surround the upper electrode layer 336. The shield electrode layer 339 is away from the upper electrode layer 336. According to such a configuration, by the shield electrode layer 339, the upper electrode layer 336 is less likely to receive influences of an external electric field from a direction along a planar direction of the first substrate 31. For example, a voltage signal that is supplied to the filter electrodes 21, 22 is less likely to act on the upper electrode layer 336.

A potential of the shield electrode layer 339 is preferably between a potential of the upper electrode layer 336 and a potential of the deflection electrode 37. More specifically, the potential of the shield electrode layer 339 (shield voltage), the potential of the upper electrode layer 336 (detection electrode voltage), and the potential of the deflection electrode 37 (deflection voltage) may satisfy a following relation according to the analysis conditions. For example, a potential of 1% to 25% of the potential applied to the deflection electrode 37 may be applied to the shield electrode layer 339. Or the shield electrode layer 338 may be grounded. With the potential of the shield electrode layer 339 being thus adjusted, example ions that are deflected by the deflection electrode 37 do not collide with the shield electrode layer 339 and lowering of the S/N ratio is less likely to be caused. Furthermore, by appropriately controlling the potentials of the shield electrode layer 339 and the deflection electrode 37, the lower electrode layer can act as the shield electrode or a capacitor electrode.

Figure 17:
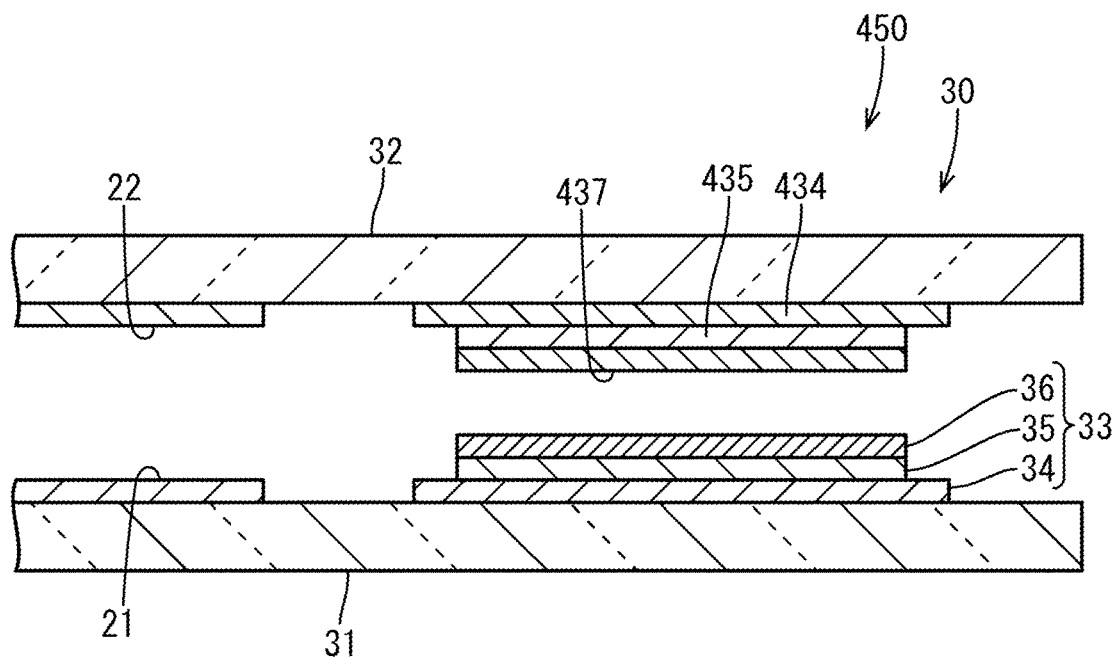

<Operation of Ionization Source: Negative Ion Formation>
Deflection voltage≤shield voltage<detection electrode voltage <Operation of Ionization Source: Positive Ion Formation>
Detection Electrode Voltage<shield voltage≤deflection voltage Fifth Embodiment A detector device 450 according to a fifth embodiment will be described with reference to FIG. 17. The fifth embodiment differs from the first to fourth embodiments in a configuration of a deflection electrode 437. Other configurations may be same as those of any of the first to fourth embodiments and the configurations, operations, and effects same as those of any of the first to fourth embodiments will not be described.

Specifically, a second lower electrode layer 434 and a second insulation layer 435 are disposed between the deflection electrode 437 and the second substrate 32 from the second substrate 32 side. The second lower electrode layer 434 functions as a shield electrode with respect to the deflection electrode 437. The deflection electrode 437, the second insulation layer 435, and the second lower electrode layer 434 are configured to have the capacitor structure. Voltage signals supplied to the filter electrodes 21, 22 may affect the deflection electrode 437. For instance, if a noise caused by the voltage signals is transferred to the deflection electrode 437, the potential of the deflection electrode 437 may become unstable and this hinders stable formation of a deflection electric field in the detection section 30. As a result, the deflection of example ions may become unstable and the detection accuracy of the collector electrode 33 detecting example ions may be lowered. However, with the above configuration, the second lower electrode layer 434 shields the deflection electrode 437 from the influence of the electric filed from the second substrate 32 side. This reduces noise that is transferred to the deflection electrode 437. Furthermore, voltages to be applied to the filter electrodes 21, 22 are less likely to be transferred to the deflection electrode 437 and a stable deflection electric field can be created in the detection section 30.

Sixth Embodiment

Figure 18:
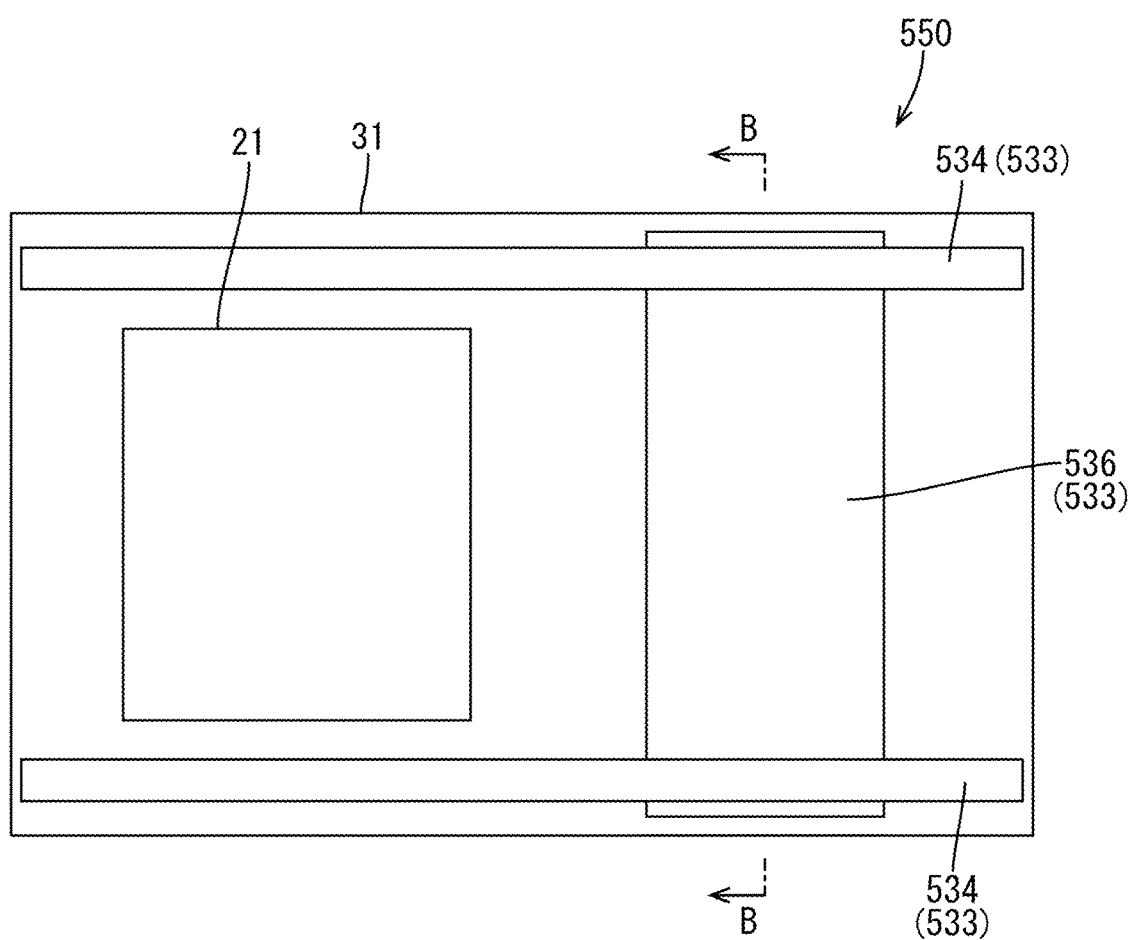
Figure 19:
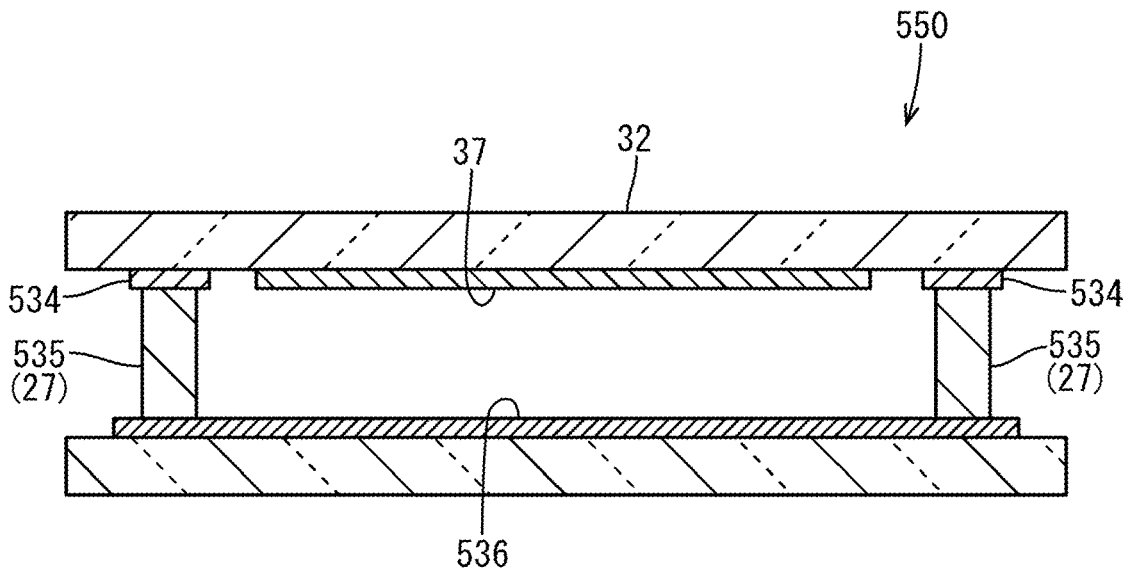

A detector device 550 according to a sixth embodiment will be described with reference to FIGS. 18 and 19. The sixth embodiment differs from the first to fifth embodiments in a configuration of a collector electrode 533. Other configurations may be same as those of any of the first to fifth embodiments and the configurations, operations, and effects same as those of any of the first to fifth embodiments will not be described.

The first filter electrode 21 and the collector electrode 533 are disposed to be spaced from each other on a surface of the first substrate 31 that is opposite the second substrate 32. The collector electrode 533 includes an upper electrode layer 536, an insulation layer 535, and a lower electrode layer 534 in this order and the upper electrode layer 536 is contacted with the first substrate 31. In other words, the layered order of the layers included in the collector electrode 533 is opposite from that of the first to fifth embodiments. The planar shape of the upper electrode layer 536 is almost same as that of the first to fifth embodiments. Two insulation layers 535 and two lower electrode layers 534 have an elongated belt shape and extend along two edges of the first substrate 31 with respect to a width direction thereof. Therefore, portions of the insulation layers 535 and the lower electrode layers 534 overlap the upper electrode layer 536 and other portions thereof do not overlap the upper electrode layer 536 but are disposed on the first substrate 31.

The second filter electrode 22, the deflection electrode 37, and the lower electrode layers 534 of the collector electrode 533 are disposed to be spaced from each other on a surface of the second substrate 32 that is opposite the first substrate 31. More specifically, the deflection electrode 37 has an area smaller than that of the upper electrode layer 536 and the upper electrode layer 536 includes extra portions on two edge portions thereof with respect to the width direction. The extra portions are not opposed to the deflection electrode 37. The insulation layers 535 and the lower electrode layers 534 having the belt shape are disposed on the extra portions of the upper electrode layer 536. The lower electrode layers 534 of the collector electrode 533 are contacted with the second substrate 32. The thickness of the lower electrode layers 534 is 1 µm or less and the thickness of the insulation layers 535 is about equal to a gap (a distance) between the first substrate 31 and the second substrate 32. In this embodiment, the insulation layers 535 function as spacers that keep the predefined gap between the first substrate 31 and the second substrate 32.

With the above configuration, the upper electrode layer 536 is contacted with the first substrate 31 and the lower electrode layers 534 are contacted with the second substrate 32 and the collector electrode 533 is formed in a columnar shape extending from the first substrate 31 to the second substrate 32. According to such a configuration, the area of the upper electrode layer 536 is greater than that of the deflection electrode 37 and example ions that are deflected can be detected more surely. The insulation layers 535 and the lower electrode layers 534 of the collector electrode 533 can be formed when the substrates 31, 32 are bonded. This simplifies the patterning process in which patterning of other circuit sections is performed with the lithography technology. Furthermore, the insulation layers 535 function s spacers that keep the predetermined gap between the first substrate 31 and the second substrate 32. With such a configuration, spacers are not necessarily prepared separately and the configuration of the detector device 550 can be simplified.

Seventh Embodiment

A detector device 650 according to a seventh embodiment will be described with reference to FIGS. 20A to 20E. The seventh embodiment differs from the first to sixth embodiments in a configuration of a TFT configured as the switching circuit. In this embodiment, a channel layer of the TFT is a low temperature polysilicon layer. Other configurations may be same as those of any of the first to sixth embodiments and the configurations, operations, and effects same as those of any of the first to sixth embodiments will not be described.

Figure 20A:
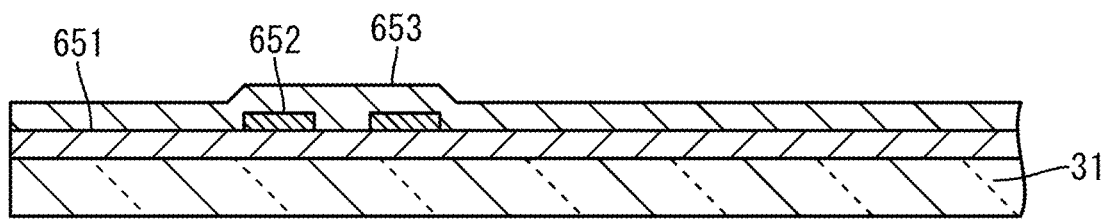
FIG. 20A a cross-sectional view illustrating one producing process of a detector device according to another embodiment FIG. 20B a cross-sectional view illustrating one producing process of the detector device according to another embodiment FIG. 20C a cross-sectional view illustrating one producing process of the detector device according to another embodiment FIG. 20D a cross-sectional view illustrating one producing process of the detector device according to another embodiment FIG. 20E a cross-sectional view illustrating one producing process of the detector device according to another embodiment FIG. 21 a plan view illustrating a configuration of a detector device according to another embodiment FIG. 22 a schematic view illustrating a configuration of a detector device according to another embodiment FIG. 23 a schematic view illustrating a configuration of a detector device according to a prior art FIG. 24 a chart illustrating detection of example ions of a low concentration in the detector device according to a prior art

First, as illustrated in FIG. 20A, a buffer layer 651, a semiconductor layer 652, and a gate insulation layer 653 are formed on the first substrate 31, which is a glass substrate, in this order with the CVD method. The buffer layer 651 is an additional component, which may not be necessarily included. The buffer layer 651 may be formed by depositing $SiN_x$, $SiO_2$, or silicon nitride (for example, $Si_2N_2O$) on an entire surface area of the first substrate 31 with a thickness of 100 nm to 300 nm. The semiconductor layer 652 is formed by depositing a layer of amorphous silicon on the buffer layer 651 with a thickness of 20 nm to 100 nm and annealing is performed with irradiation of laser to cause crystallization and obtain polycrystalline material from amorphous (non-crystalline) silicon. Thereafter, the obtained material is patterned into a predefined form with the known photolithography method (through the photolithography process, the dry etching process, and the resist removing and cleaning process) and the semiconductor layer 652 is thus formed. The gate insulation layer 653 is formed by depositing a layer of $SiN_x$ or $SiO_2$, or a layered structure of $SiN_x/SiO_2$ with a thickness of 50 nm to 200 nm on an entire surface area.

Figure 20B:
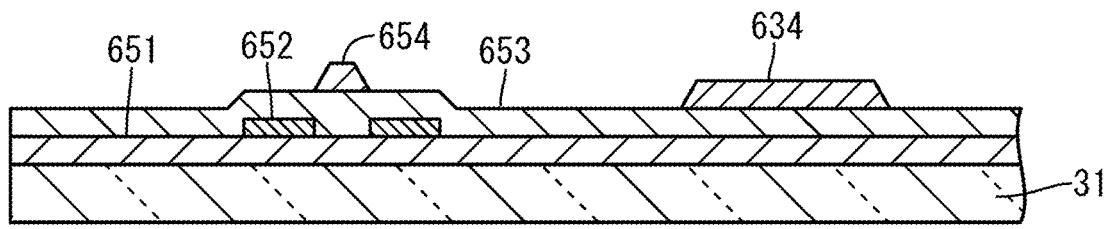

Next, as illustrated in FIG. 20B, a gate electrode 654 is formed. A lower electrode layer 634 of a collector electrode 633 may be formed at the same time and in the same process as the gate electrode 654 is formed and formed from the same material as that of the gate electrode 654. The gate electrode 654 and the lower electrode layer 634 are formed by depositing a metal layer of W, Mo, or Al with a thickness of 100 nm to 400 nm with the sputtering method and patterning the layer into a predefined form with the known photolithography method (through the photolithography process, the dry etching process, and the resist removing ad cleaning process). The gate electrode 654 and the lower electrode layer 634 may be a MoW alloy layer or may have a layered structure of a combination of metal layers such as W/Ta, Ti/Al, Ti/Al/Ti, and Al/Ti from an upper layer side to increase adhesiveness and contact properties.

Figure 20C:
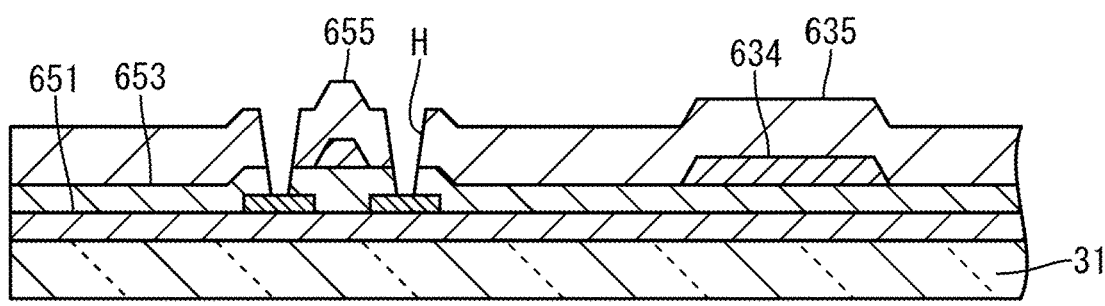

Then, as illustrated in FIG. 20C, an interlayer insulation layer 655 is formed. An insulation layer 635 of the collector electrode 633 may be formed at the same time and in the same process as the interlayer insulation layer 655 is formed and formed from the same material as that of the interlayer insulation layer 655. The interlayer insulation layer 655 and the insulation layer 635 may be a single layer of $SiN_x$, a single layer of $SiO_2$, or a single layer of silicon nitride (for example $Si_2N_2O$) or may be a layered film having a layered structure. The thicknesses of the interlayer insulation layer 655 and the insulation layer 635 may be about 500 nm to 900 nm. Then, a contact hole H is formed at a predefined position with the known photolithography method (through the photolithography process, the dry etching process, and the resist removing ad cleaning process).

Figure 20D:
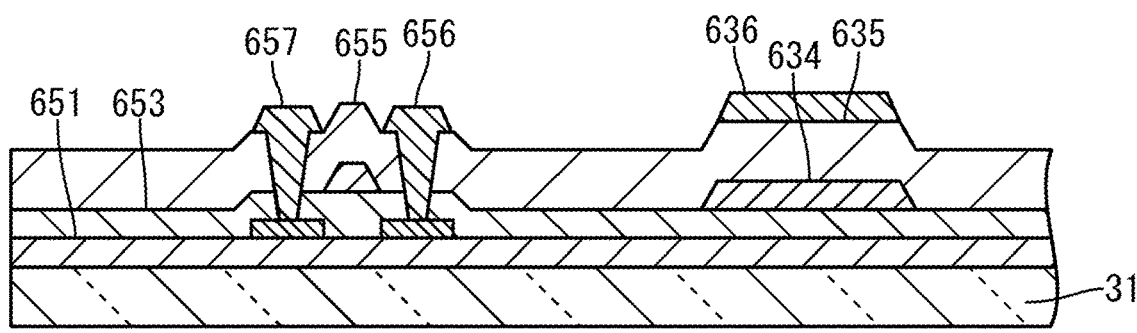

Next, as illustrated in FIG. 20D, a source electrode 656 and a drain electrode 657 are formed. An upper electrode layer 636 of a collector electrode 633 may be formed at the same time and in the same process as the source electrode 656 and the drain electrode 657 are formed and formed from the same material as that of the source electrode 656 and the drain electrode 657. The upper electrode layer 636, the source electrode 656, and the drain electrode 657 are formed by depositing a metal layer of Al or Mo with a thickness of 200 nm to 400 nm with the sputtering method and patterning the layer into a predefined form with the known photolithography method (through the photolithography process, the dry etching process, and the resist removing ad cleaning process). The upper electrode layer 636, the source electrode 656, and the drain electrode 657 may be a metal layer or an alloy layer of a layered structure of a combination of metal layers such as Ti/Al, Ti/Al/Ti, Al/Ti, TiN/Al/TiN, Mo/Al, Mo/Al/Mo, Mo/AlNd/Mo, MON/Al/MON from an upper layer side to increase adhesiveness and contact properties.

Figure 20E:
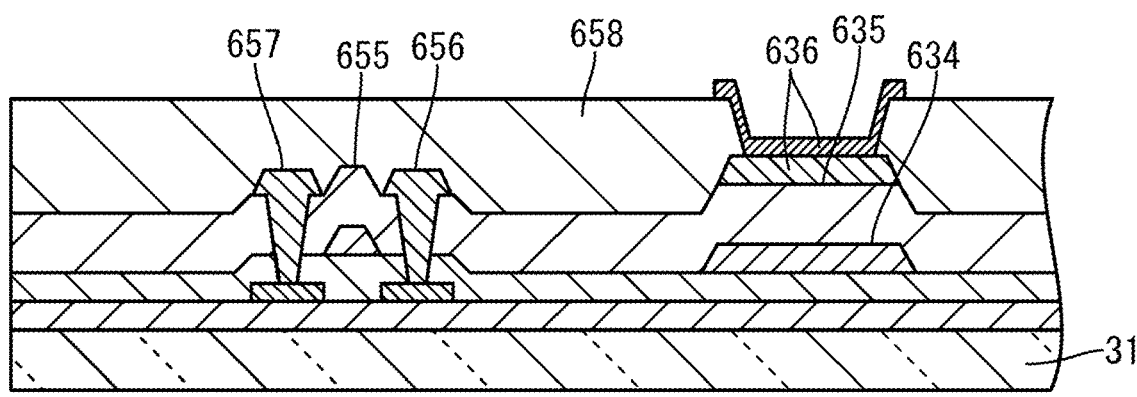

Then, as illustrated in FIG. 20E, an interlayer insulation film 658 is formed and the upper electrode layer 636 of the collector electrode 633 is formed again. The interlayer insulation film 658 is formed by disposing photosensitive organic material and patterning the material into a predefined form with the known photolithography method (through the photolithography process, the wet etching process, and the resist removing ad cleaning process). Thus, a staggered TFT is produced as the switching circuit 38B. The upper electrode layer 636 may be formed by depositing an IZO layer with a thickness of 50 nm to 200 nm with the sputtering method and patterning the layer into a predefined form with the known photolithography method (through the photolithography process, the wet etching process, and the resist removing ad cleaning process). The lower electrode layer 634 may be produced with using other material such as ITO, Ti, Mo, W, Ta instead of using IZO. Thus, the collector electrode 633 is produced.

Eighth Embodiment

Figure 21:
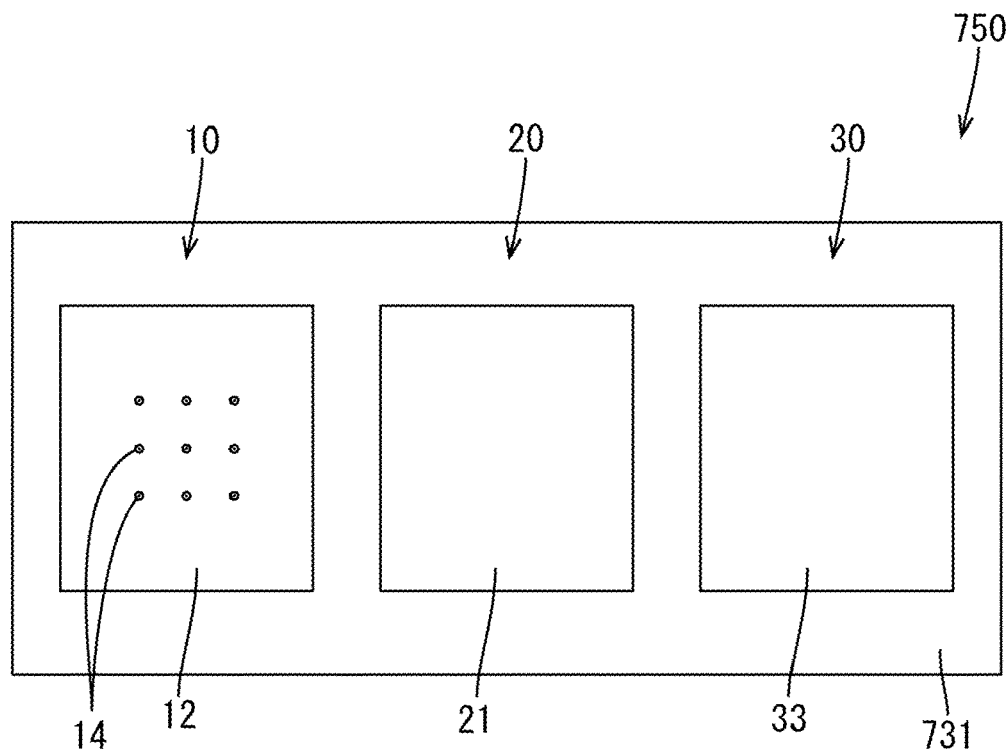

A detector device 750 according to an eighth embodiment will be described with reference to FIG. 21. The eighth embodiment differs from the first embodiment in that the detector device 750 integrally includes the ionization source 10. Other configurations may be same as those of any of the first to seventh embodiments and the configurations, operations, and effects same as those of any of the first to seventh embodiments will not be described.

A first substrate 731 and a second substrate have a greater dimension measured in a longitudinal direction (the mobility direction of ions). The first filter electrode 21 and the second filter electrode 22 are disposed in middle sections of the first substrate 731 and the second substrate with respect to the longitudinal direction. The collector electrode 33 and the deflection electrode 37 are disposed on downstream side sections (right side sections in FIG. 21) of the first substrate 731 and the second substrate with respect to the longitudinal direction so as to be away from the first filter electrode 21 and the second filter electrode 22. A plate electrode 12 and a needle electrode 14 that are configured as the ionization source 10 are disposed on upstream sections of the first substrate 731 and the second substrate.

Specifically, the plate electrode 12 for corona discharge is disposed on the upstream side section (a left side section in FIG. 21) of the first substrate 731 so as to be away from the first filter electrode 21. The plate electrode 12 is grounded. The needle electrodes 14 are mounted on the upstream side section of the second substrate such that distal ends of the needle electrodes 14 point the plate electrode 12. With the needle electrodes 14 being supplied with a positive or negative direct current, corona discharge occurs between the needle electrode 14 and the plate electrode 12. Corona discharge ionizes gas molecules easily. Therefore, with gas s (gas molecules) that is a target to be analyzed being supplied to a space between the first substrate 731 and the second substrate, corona discharge occurs between the needle electrodes 14 and the plate electrode 12 and gas molecules are ionized. With the detector device 750 including the ionization source, a series of performances of ionization, separation of components, and detection can be performed easily. With a combination of the needle electrode and the plate electrode being used for the ionization source 10, examples can be effectively ionized with a simple structure and without using a complicated circuit. The detector device 750 having the above configuration integrally includes the ionization source 10; however, the detector device 750 has a compact and simple configuration and can be used as a FAIMS analyzer having good portability.

Ninth Embodiment

Figure 22:
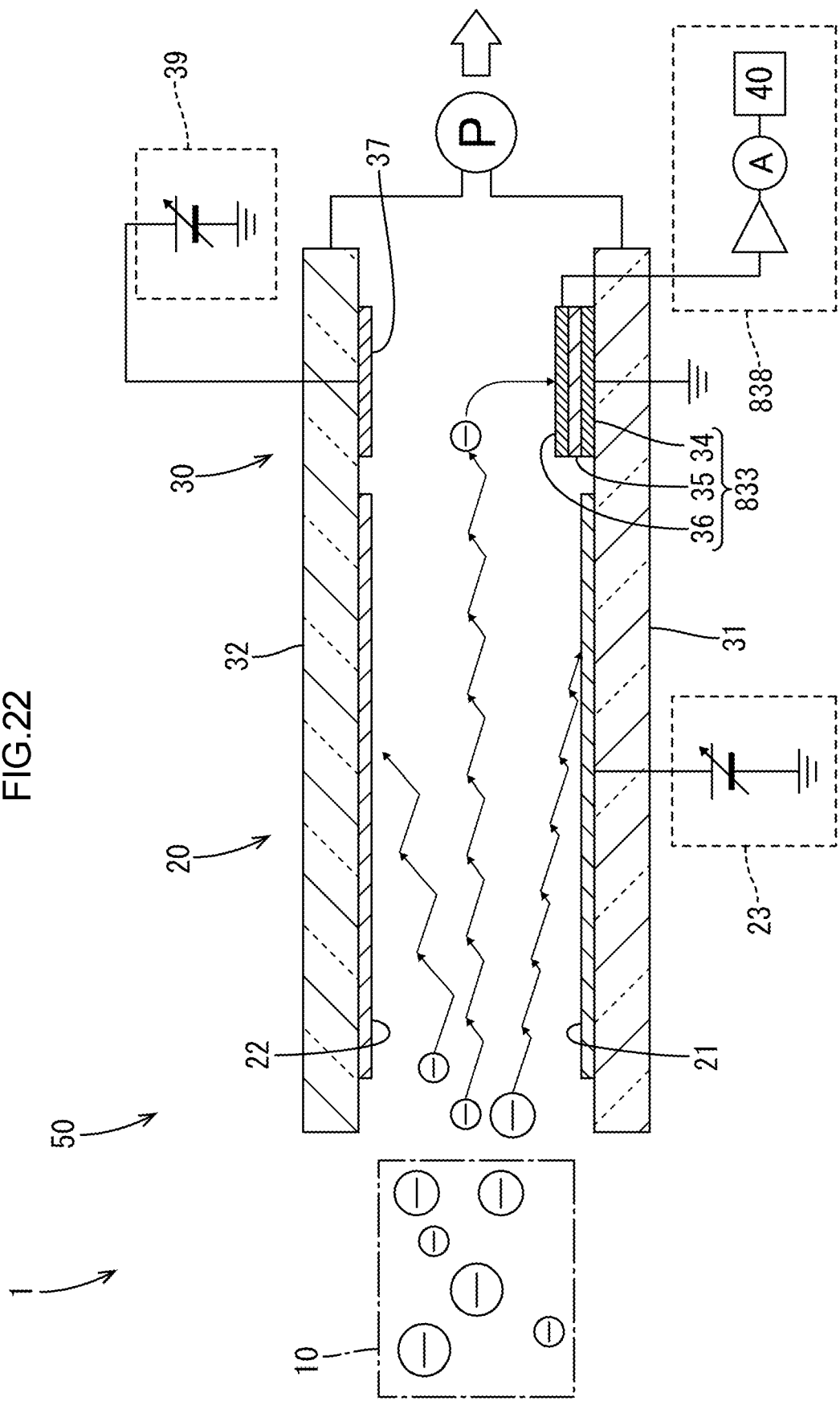
Figure 23:
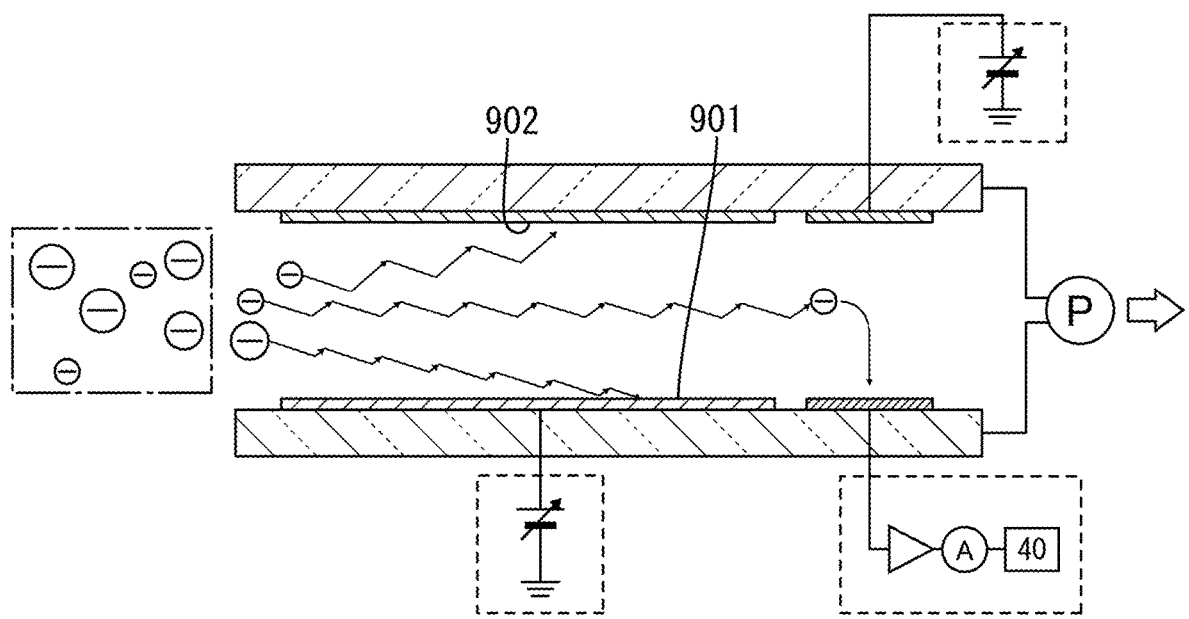
Figure 24:
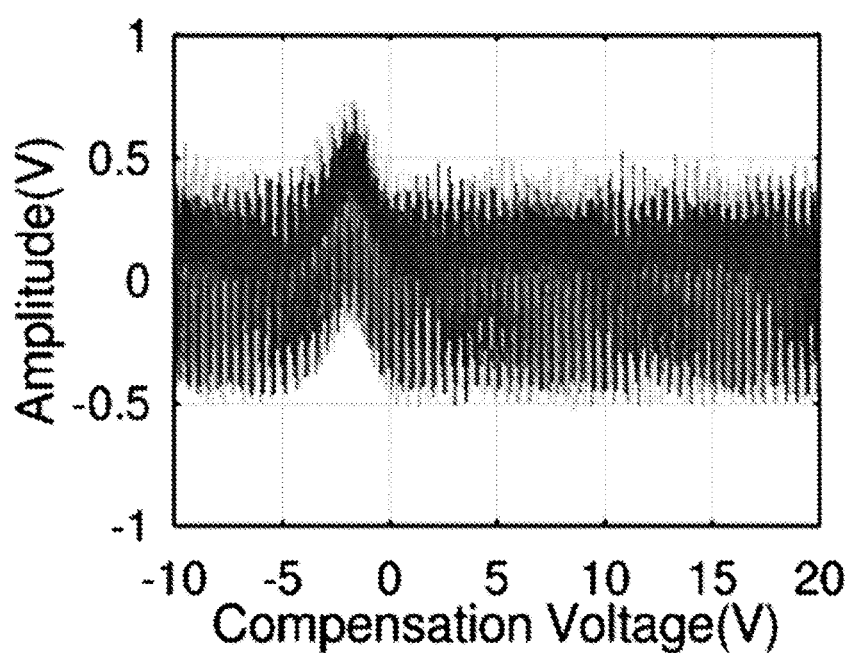

A detector device 850 according to a ninth embodiment will be described with reference to FIG. 22. The detector device 850 of the ninth embodiment differs from the first embodiment in that a detection circuit 838 is connected to the upper electrode layer 36 of a collector electrode 833 and the lower electrode layer 34 of the collector electrode 833 is grounded. Other configurations may be same as those of any of the first to eighth embodiments and the configurations, operations, and effects same as those of any of the first to eighth embodiments will not be described.

In such a configuration, the lower electrode layer 34 can shield the upper electrode layer 36. The upper electrode layer 36 is insulated from the lower electrode layer 34 by the insulation layer 35. The lower electrode layer 34 is directly disposed on the first substrate 31 on which the first filter electrode 21 is disposed; however, the lower electrode layer 34 is grounded. Therefore, the upper electrode layer 36 is electrically insulated and physically away from the first filter electrode 21, to which a high electric field is applied, via the first substrate 31, the lower electrode layer 34, and the insulation layer 35. According to such a configuration, even with the concentration of example ions being low and the amount of example ions to be collected being small, the upper electrode layer 36 is likely to be affected by the high electric field that is applied to the first filter electrode 21. The detection circuit 838 can detect a trace component with high accuracy (for example, a high ratio of S/N) and suppressing noise caused by a high electric field by detecting charges that are stored on the upper electrode layer 36.

Other Embodiments

The technology described herein is not limited to the embodiments described above and illustrated by the drawings. For example, the following embodiments will be included in the technical scope of the present technology.

(1) In the detector device of each of the above embodiments, the filter section is included on the substrates which are flat plates of the detector device. However, the filter section may be included on opposite surfaces of two curved substrates that are disposed such that cross sections are in a coaxial arrangement. In such a configuration, a center-side substrate and one filter electrode may be rotatable about a coaxially center portion. Accordingly, a length of a portion of the filter section for the separation of example ions can be reduced and the length dimension along a gas flow direction can be small.

(2) In the above embodiments, ArF excimer laser is used as an exposure light source in the micromachining technology (lithography technology) for producing electrodes. The exposure light source is not necessarily limited to the above one but may be exposure light sources that emit KrF excimer laser, ultraviolet rays, extreme ultraviolet rays (EUV), synchrotron radiation (typically, X-rays), ionizing radiation (typically, electron beam), and ion beam.

(3) In the above embodiments, in the TFT configured as the switching circuit, the channel layer is an amorphous Si layer but may be made of oxide semiconductor such as IGZO. In such a configuration, an oxide semiconductor layer may be formed by depositing a layer of oxide semiconductor with a thickness of 30 nm to 300 nm with the sputtering method and the layer is patterned into a predefined form with the known photolithography method (through the photolithography process, the wet etching process, and the resist removing ad cleaning process).

(4) In the above embodiments, the TFT is used as the switching circuit and the switching circuit is included on the first substrate similar to the first filter electrode layer and the collector electrode. However, the switching circuit may not be necessarily disposed on the substrate but may be a separate component provided separately from the substrates 31, 32.

(5) In the above embodiments, the configuration including the variable voltage generator that is connected to only one of the electrodes 21, 22 (the first filter electrode 21 in the embodiments) is described with the drawings. However, a method of applying an appropriate voltage to the electrodes 21, 22 is not particularly limited but the known various configurations may be used. For example, the variable voltage generator may be connected only to the second filter electrode 22 of the electrodes 21, 22 or may be connected to both of the electrodes 21, 22. In the latter configuration, a potential adjustment circuit for applying a dispersion voltage may be connected to one electrode (for example, the second filter electrode 22) and a potential adjustment circuit for applying a compensation voltage may be connected to other electrode (for example, the first filter electrode 21).

EXPLANATION OF SYMBOLS

1: Mobility analyzer, 10: Ionization source, 20: Ion filter section, 21: First filter electrode, 22: Second filter electrode, 23: First potential adjustment section, 25: External connection terminal, 26A: Second substrate external connection terminal, 26B: External connection terminal, 27: Spacer, 30: Detection section, 31, 731: First substrate, 32, 732: Second substrate, 33, 333, 533, 633: Collector electrode, 34, 534, 634: Lower electrode layer, 35, 535, 635: Insulation layer, 36, 336, 536, 636: Upper electrode layer, 36A: Capture surface, 37, 437: Deflection electrode, 38, 138, 238, 838: Detection circuit, 38A, 138A, 238A: Amplifier, 38B, 138B, 238B: Switching circuit, 39: Second potential adjustment section, 40: Control section, 50, 350, 450, 550, 650: Detector device

The invention claimed is:

1. A detector device comprising:
a pair of filter electrodes that are disposed opposite each other;
a collector electrode collecting charged particles that pass through a space between the pair of filter electrodes; and
a detection circuit connected to the collector electrode and detecting an amount of the charged particles that are collected, wherein
the collector electrode includes
an upper electrode layer having a collection surface that receives the charged particles,
a lower electrode layer that is disposed opposite a surface of the upper electrode layer that is an opposite surface from the collection surface, and
an insulation layer having an insulation property and disposed between the upper electrode layer and the lower electrode layer, and
the detection circuit is configured to be connected to one of the upper electrode layer and the lower electrode layer.

2. The detector device according to claim 1, further comprising a first substrate and a second substrate that have an insulating property and are plate members and disposed to be opposite each other, wherein
the collector electrode and one of the filter electrodes are disposed on an opposing surface of the first substrate to be away from each other,
the lower electrode layer of the collector electrode is contacted with the first substrate, and
another one of the filter electrodes and a deflection electrode are disposed on an opposing surface of the second substrate to be away from each other, the deflection electrode being for deflecting the charged particles toward the upper electrode layer of the collector electrode.

3. The detector device according to claim 1, further comprising a first substrate and a second substrate that have an insulating property and are plate members and disposed to be opposite each other, wherein
the collector electrode and one of the filter electrodes are disposed on an opposing surface of the first substrate to be away from each other,
the upper electrode layer of the collector electrode is contacted with the first substrate, and
another one of the filter electrodes, a deflection electrode, and the lower electrode layer of the collector electrode are disposed on an opposing surface of the second substrate to be away from each other, the deflection electrode being for deflecting the charged particles toward the upper electrode layer of the collector electrode.

4. The detector device according to claim 3, wherein the insulation layer of the collector electrode is configured as a spacer that defines a distance between the first substrate and the second substrate.

5. The detector device according to claim 2, wherein a distance between the first substrate and the second substrate is 1 mm or less.

6. The detector device according to claim 2, further comprising a second lower electrode layer and a second insulation layer that are disposed between the deflection electrode and the second substrate in this order from a second substrate side.

7. The detector device according to claim 2, further comprising an ionization source disposed on at least one of the first substrate and the second substrate and on an opposite side from the collector electrode with respect to the pair of filter electrodes, the ionization source ionizing gas molecules.

8. The detector device according to claim 1, further comprising a shield electrode layer disposed on a surface of the insulation layer to be away from and surround the upper electrode layer.

9. The detector device according to claim 1, wherein thicknesses of the pair of filter electrodes, the upper electrode layer, and the lower electrode layer are 1 µm or less.

10. The detector device according to claim 1, wherein the pair of filter electrodes and the upper electrode layer have surfaces that are to be contacted with the charged particles and at least the surfaces are made of organic electrically conductive material or inorganic electrically conductive material.

11. The detector device according to claim 1, wherein the detection circuit includes a switching circuit that switches a connection state with respect to one of the upper electrode layer and the lower electrode layer between connection and disconnection.

12. The detector device according to claim 11, wherein the switching circuit is configured to change switching timing according to concentration of the charged particles.

13. The detector device according to claim 11, further comprising a potential adjustment section configured to apply a voltage between the pair of filter electrodes and change a potential difference between the pair of filter electrodes stepwise, wherein the detection circuit is configured to be connected to one of the upper electrode layer and the lower electrode layer at a timing when the potential adjustment section changes the potential difference.

* * * * *